US012634232B2

(12) United States Patent
Marrone et al.

(10) Patent No.: US 12,634,232 B2
(45) Date of Patent: May 19, 2026

(54) POLICY BUILDER FOR OVERLAY NETWORKS

(71) Applicant: Tyco Fire & Security GmbH, Neuhausen am Rheinfall (CH)

(72) Inventors: Nicholas Anthony Marrone, Seattle, WA (US); Bryan David Skene, Seattle, WA (US); Jared Dupree Williams, Seattle, WA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 236 days.

(21) Appl. No.: 18/236,113

(22) Filed: Aug. 21, 2023

(65) Prior Publication Data

US 2025/0071053 A1     Feb. 27, 2025

(51) Int. Cl.
*H04L 45/64* (2022.01)
*H04L 45/12* (2022.01)

(52) U.S. Cl.
CPC ............ *H04L 45/64* (2013.01); *H04L 45/124* (2013.01)

(58) Field of Classification Search
None
See application file for complete search history.

(56) References Cited

U.S. PATENT DOCUMENTS

| | | | |
|---|---|---|---|
| 5,835,727 | A | 11/1998 | Wong et al. |
| 6,158,010 | A | 12/2000 | Moriconi et al. |

| | | | |
|---|---|---|---|
| 6,981,156 | B1 | 12/2005 | Stern et al. |
| 7,209,956 | B2 | 4/2007 | Mache |
| 7,324,533 | B1 | 1/2008 | DeLiberato et al. |
| 7,373,660 | B1 | 5/2008 | Guichard et al. |
| 7,395,349 | B1 | 7/2008 | Szabo et al. |
| 7,796,593 | B1 | 9/2010 | Ghosh et al. |

(Continued)

FOREIGN PATENT DOCUMENTS

| | | |
|---|---|---|
| WO | 2007/038872 A1 | 4/2007 |
| WO | 2008/039506 A2 | 4/2008 |

(Continued)

OTHER PUBLICATIONS

Office Communication for U.S. Appl. No. 16/562,258 mailed on Mar. 19, 2021, 11 Pages.

(Continued)

*Primary Examiner* — Xavier S Wong
(74) *Attorney, Agent, or Firm* — Foley & Lardner LLP

(57) ABSTRACT

Embodiments are directed to managing communication over a network. Entities may be determined based on network traffic in an underlay network and classified based on characteristics of the entities, portions of the network traffic in the underlay network, or the like. Policies for an overlay network may be generated based on the classified entities or the portions of the network traffic. Policies may be deployed to gateways that may be associated with the entities such that the gateways facilitate access to the overlay network based on the policies. In response to determining other entities in the underlay network based on other network traffic in the overlay network and the network traffic in the underlay network, the one or more policies may be updated based on the other network traffic in the overlay network, the network traffic in the underlay network, or the one or more other entities.

20 Claims, 19 Drawing Sheets

(56) References Cited

U.S. PATENT DOCUMENTS

| | | |
|---|---|---|
| 7,881,199 B2 | 2/2011 | Krstulich |
| 7,996,894 B1 | 8/2011 | Chen et al. |
| 8,224,971 B1 | 7/2012 | Miller et al. |
| 8,429,400 B2 | 4/2013 | Khalid et al. |
| 8,489,701 B2 | 7/2013 | Manion et al. |
| 8,607,301 B2 | 12/2013 | Carrasco |
| 8,630,183 B2 | 1/2014 | Miyata |
| 8,832,211 B1 | 9/2014 | Lebedev et al. |
| 8,886,827 B2 | 11/2014 | Goel et al. |
| 8,959,513 B1 | 2/2015 | Swaminathan |
| 9,264,522 B1 | 2/2016 | Reeves et al. |
| 9,300,635 B1 | 3/2016 | Gilde et al. |
| 9,344,403 B2 | 5/2016 | Mattes et al. |
| 9,621,514 B2 | 4/2017 | Gilde et al. |
| 9,729,580 B2 | 8/2017 | Mattes et al. |
| 9,729,581 B1 | 8/2017 | Skene et al. |
| 9,774,586 B1 | 9/2017 | Roche et al. |
| 10,038,725 B2 | 7/2018 | Mattes et al. |
| 10,069,726 B1 | 9/2018 | Ahrenholz et al. |
| 10,116,539 B1 | 10/2018 | Fuchs et al. |
| 10,158,545 B1 | 12/2018 | Marrone et al. |
| 10,178,133 B2 | 1/2019 | Mattes et al. |
| 10,200,281 B1 | 2/2019 | Ahrenholz et al. |
| 10,326,799 B2 | 6/2019 | Skene et al. |
| 10,797,979 B2 | 10/2020 | Fuchs et al. |
| 10,797,993 B2 | 10/2020 | Ahrenholz et al. |
| 10,911,418 B1 * | 2/2021 | Fuchs ................. H04L 63/0428 |
| 10,999,154 B1 | 5/2021 | Ahrenholz et al. |
| 11,070,594 B1 | 7/2021 | Marrone et al. |
| 11,223,538 B1 * | 1/2022 | Arumugam ............. H04L 45/26 |
| 11,509,559 B2 | 11/2022 | Marrone et al. |
| 11,582,129 B2 | 2/2023 | Marrone et al. |
| 11,729,152 B2 | 8/2023 | Fuchs et al. |
| 11,736,559 B2 * | 8/2023 | Nair ........................ H04L 47/20 |
| | | 709/223 |
| 2002/0026532 A1 | 2/2002 | Maeda et al. |
| 2002/0073182 A1 | 6/2002 | Zakurdaev et al. |
| 2002/0143855 A1 | 10/2002 | Traversat et al. |
| 2003/0061479 A1 | 3/2003 | Kimura |
| 2003/0081620 A1 | 5/2003 | Danner et al. |
| 2003/0123436 A1 | 7/2003 | Joseph et al. |
| 2004/0024905 A1 | 2/2004 | Liao et al. |
| 2004/0143628 A1 | 7/2004 | Bradford et al. |
| 2004/0268121 A1 | 12/2004 | Shelest et al. |
| 2005/0014500 A1 | 1/2005 | Muhonen et al. |
| 2005/0052999 A1 | 3/2005 | Oliver et al. |
| 2005/0265355 A1 | 12/2005 | Havala et al. |
| 2006/0190458 A1 | 8/2006 | Mishina et al. |
| 2006/0233166 A1 | 10/2006 | Bou-Diab et al. |
| 2007/0019641 A1 | 1/2007 | Pai et al. |
| 2007/0081530 A1 | 4/2007 | Nomura et al. |
| 2007/0226781 A1 | 9/2007 | Chen et al. |
| 2007/0230352 A1 | 10/2007 | Kokku et al. |
| 2007/0258440 A1 | 11/2007 | Watanabe |
| 2008/0072282 A1 | 3/2008 | Willis et al. |
| 2008/0082823 A1 | 4/2008 | Starrett et al. |
| 2008/0151916 A1 | 6/2008 | Jetcheva et al. |
| 2008/0232360 A1 | 9/2008 | Mihaly et al. |
| 2008/0288614 A1 | 11/2008 | Gil et al. |
| 2008/0307519 A1 | 12/2008 | Curcio et al. |
| 2009/0010168 A1 | 1/2009 | Yurchenko et al. |
| 2009/0034738 A1 | 2/2009 | Starrett |
| 2009/0059906 A1 | 3/2009 | Cullen |
| 2009/0129374 A1 | 5/2009 | Yurchenko et al. |
| 2009/0210518 A1 | 8/2009 | Verma et al. |
| 2009/0210541 A1 | 8/2009 | Chandolu et al. |
| 2009/0310518 A1 | 12/2009 | Jayaram et al. |
| 2010/0014533 A1 | 1/2010 | Hirano et al. |
| 2010/0024026 A1 | 1/2010 | Ylonen et al. |
| 2010/0027442 A1 | 2/2010 | Chockler et al. |
| 2010/0042747 A1 | 2/2010 | Hascalovici et al. |
| 2010/0165878 A1 | 7/2010 | Soni |
| 2010/0214959 A1 | 8/2010 | Kuehnel et al. |
| 2010/0218235 A1 | 8/2010 | Ganot |
| 2010/0254395 A1 | 10/2010 | Smith et al. |

| | | |
|---|---|---|
| 2011/0016509 A1 | 1/2011 | Huang et al. |
| 2011/0035466 A1 | 2/2011 | Panigrahi |
| 2011/0090892 A1 | 4/2011 | Cooke |
| 2011/0103393 A1 | 5/2011 | Meier et al. |
| 2011/0141881 A1 | 6/2011 | Joshi et al. |
| 2012/0110203 A1 | 5/2012 | Ozawa |
| 2012/0163196 A1 | 6/2012 | Jansen et al. |
| 2012/0304243 A1 | 11/2012 | Li et al. |
| 2013/0010621 A1 | 1/2013 | Yoshiuchi et al. |
| 2013/0018993 A1 | 1/2013 | Hui et al. |
| 2013/0046414 A1 | 2/2013 | Ree |
| 2013/0083725 A1 | 4/2013 | Mallya et al. |
| 2013/0198830 A1 | 8/2013 | Nemoto et al. |
| 2013/0212378 A1 | 8/2013 | Falk et al. |
| 2013/0254264 A1 | 9/2013 | Hankinson et al. |
| 2013/0283364 A1 | 10/2013 | Chang et al. |
| 2014/0026207 A1 | 1/2014 | Wang et al. |
| 2014/0133354 A1 | 5/2014 | Scharf et al. |
| 2014/0150070 A1 | 5/2014 | Peterson |
| 2014/0223507 A1 | 8/2014 | Xu |
| 2014/0282817 A1 | 9/2014 | Singer et al. |
| 2014/0282850 A1 | 9/2014 | Mattes et al. |
| 2014/0307744 A1 | 10/2014 | Dunbar et al. |
| 2014/0348131 A1 | 11/2014 | Duan et al. |
| 2015/0024677 A1 | 1/2015 | Gopal et al. |
| 2015/0046997 A1 | 2/2015 | Gupta et al. |
| 2015/0057766 A1 | 2/2015 | Ejiri et al. |
| 2015/0067033 A1 | 3/2015 | Martinsen et al. |
| 2015/0124823 A1 | 5/2015 | Pani et al. |
| 2015/0135259 A1 | 5/2015 | Ilyadis et al. |
| 2015/0281074 A1 | 10/2015 | Kubota |
| 2015/0365316 A1 | 12/2015 | Liao et al. |
| 2015/0372828 A1 | 12/2015 | Hao et al. |
| 2016/0028624 A1 | 1/2016 | Song et al. |
| 2016/0036861 A1 | 2/2016 | Mattes et al. |
| 2016/0149804 A1 | 5/2016 | Mirza |
| 2016/0182378 A1 | 6/2016 | Basavaraja et al. |
| 2016/0188527 A1 | 6/2016 | Cherian et al. |
| 2016/0255542 A1 | 9/2016 | Hughes et al. |
| 2016/0261641 A1 | 9/2016 | Mattes et al. |
| 2016/0366096 A1 | 12/2016 | Gilde et al. |
| 2017/0019430 A1 | 1/2017 | Cohn |
| 2017/0142208 A1 | 5/2017 | Hammer et al. |
| 2017/0238215 A1 | 8/2017 | Jin |
| 2017/0373936 A1 | 12/2017 | Hooda et al. |
| 2018/0083968 A1 | 3/2018 | Xu et al. |
| 2018/0084060 A1 | 3/2018 | Xie et al. |
| 2018/0124183 A1 | 5/2018 | Kozat et al. |
| 2018/0183833 A1 | 6/2018 | Skene et al. |
| 2018/0183834 A1 | 6/2018 | Mattes et al. |
| 2018/0234459 A1 | 8/2018 | Kung et al. |
| 2019/0068592 A1 | 2/2019 | Mattela et al. |
| 2019/0132152 A1 | 5/2019 | Wang et al. |
| 2019/0149401 A1 | 5/2019 | Ramachandran et al. |
| 2019/0158397 A1 | 5/2019 | Ju |
| 2019/0363960 A1 | 11/2019 | Fuchs et al. |
| 2019/0372876 A1 | 12/2019 | Marrone et al. |
| 2019/0394107 A1 | 12/2019 | Marrone et al. |
| 2020/0007443 A1 | 1/2020 | Ahrenholz et al. |
| 2020/0067341 A1 | 2/2020 | Glover et al. |
| 2020/0177503 A1 | 6/2020 | Hooda et al. |
| 2021/0084048 A1 | 3/2021 | Kannan et al. |
| 2021/0385164 A1 * | 12/2021 | Parmar ................. H04L 45/021 |
| 2021/0409384 A1 | 12/2021 | Fuchs et al. |
| 2022/0131758 A1 | 4/2022 | Ahrenholz et al. |
| 2022/0182420 A1 | 6/2022 | Marrone et al. |
| 2023/0188446 A1 | 6/2023 | Marrone et al. |
| 2024/0223454 A1 * | 7/2024 | Miriyala ................. H04L 63/20 |

FOREIGN PATENT DOCUMENTS

| | | |
|---|---|---|
| WO | 2011/159842 A2 | 12/2011 |
| WO | 2014/150567 A1 | 9/2014 |

(56)          References Cited

FOREIGN PATENT DOCUMENTS

WO      2016/019183 A1      2/2016
WO      2019/246331 A1      12/2019

OTHER PUBLICATIONS

Office Communication for U.S. Appl. No. 16/562,258 mailed on Oct. 22, 2019, 5 Pages.
Office Communication for U.S. Appl. No. 17/084,557 mailed Dec. 16, 2020, 23 Pages.
Office Communication for U.S. Appl. No. 17/164,488 mailed on Sep. 19, 2022, 6 Pages.
Office Communication for U.S. Appl. No. 17/246,520 mailed Aug. 18, 2022, 8 Pages.
Office Communication for U.S. Appl. No. 14/204,907 mailed on Jul. 10, 2015, 20 Pages.
Office Communication for U.S. Appl. No. 14/740,053 mailed on Jul. 29, 2015, 10 Pages.
Office Communication for U.S. Appl. No. 15/156,254 mailed on Aug. 3, 2016, 13 Pages.
Office Communication for U.S. Appl. No. 15/156,254 mailed on May 5, 2017, 13 Pages.
Office Communication for U.S. Appl. No. 14/814,283 mailed on Jun. 9, 2017, 18 Pages.
Office Communication for U.S. Appl. No. 15/083,214 mailed on Feb. 9, 2017, 10 Pages.
Office Communication for U.S. Appl. No. 15/201,063 mailed on Apr. 21, 2017, 14 Pages.
Office Communication for U.S. Appl. No. 15/670,859 mailed on Apr. 4, 2019, 14 Pages.
Office Communication for U.S. Appl. No. 15/670,925 mailed on Nov. 15, 2018, 08 Pages.
Office Communication for U.S. Appl. No. 15/924,148 mailed on Jun. 5, 2018, 13 Pages.
Office Communication for U.S. Appl. No. 15/987,762 mailed on Sep. 12, 2018, 13 Pages.
Office Communication for U.S. Appl. No. 15/994,760 mailed on Oct. 1, 2018, 10 Pages.
Office Communication for U.S. Appl. No. 16/120,043 mailed on Nov. 28, 2018, 9 Pages.
Office Communication for U.S. Appl. No. 16/172,621 mailed on Jul. 15, 2020, 15 Pages.
Office Communication for U.S. Appl. No. 16/221,145 mailed on Oct. 14, 2022, 7 Pages.
Office Communication for U.S. Appl. No. 16/267,166 mailed on Jul. 22, 2020, 8 Pages.
Office Communication for U.S. Appl. No. 16/562,258 mailed on Jul. 20, 2022, pp. 1-9.
Office Communication for U.S. Appl. No. 16/913,114 mailed on Oct. 1, 2020, 21 Pages.
Office Communication for U.S. Appl. No. 17/079,248 mailed on Jan. 7, 2021, 10 Pages.
Office Communication for U.S. Appl. No. 17/084,557 on mailed Apr. 1, 2021, 11 Pages.
Office Communication for U.S. Appl. No. 17/164,488 mailed on Mar. 27, 2023, 11 Pages.
Office Communication for U.S. Appl. No. 17/246,520 mailed Jul. 24, 2023, 8 Pages.
Office Communication for U.S. Appl. No. 17/378,535 mailed Jul. 6, 2023, 11 Pages.
Office Communication for U.S. Appl. No. 14/204,907 mailed Feb. 24, 2016, 14 Pages.
Office Communication for U.S. Appl. No. 14/740,053 mailed on Jan. 21, 2016, 18 Pages.
Office Communication for U.S. Appl. No. 15/156,254 mailed on May 14, 2018, 19 Pages.
Trusted Computing Group Architects Guide; ICS Security Using TNC Technology, Oct. 2013, 6 Pages.

Trusted Computing Group, Incorporated, "TCG Trusted Network Connect: IF-MAP Metadata for ICS Security" Specification Version 1.0, Revision 44, May 8, 2014, pp. 1-64.
Office Communication for U.S. Appl. No. 14/814,283 mailed on Aug. 23, 2016, 7 Pages.
Office Communication for U.S. Appl. No. 15/083,214 mailed on Jan. 9, 2017, 6 Pages.
Office Communication for U.S. Appl. No. 15/670,859 mailed on Feb. 15, 2019, 3 Pages.
Office Communication for U.S. Appl. No. 16/221,145 mailed Nov. 23, 2020, 4 Pages.
Office Communication for U.S. Appl. No. 16/562,258 mailed on Nov. 20, 2020, 3 Pages.
Office Communication for U.S. Appl. No. 17/246,520 mailed on Jun. 23, 2023, 4 Pages.
Office Communication for U.S. Appl. No. 15/156,254 mailed on Jan. 12, 2018, 02 Pages.
Office Communication for U.S. Appl. No. 15/156,254 mailed on Mar. 30, 2017, 04 Pages.
Aoyagi et al., "ELA: A Fully Distributed VPN System Over Peer-to-Peer Network," Proceedings of the 2005 Symposium on Applications and the Internet, 2005, IEEE, Computer Society, 4 Pages.
Asguard Networks, Inc., "Gray Matter Systems Announces Asguard Networks Partnership at 2012 Gray Matter Systems Training and User Group Meeting," Aug. 9, 2012, retrieved on Oct. 23, 2012, from http://www.asguardnetworks.com/news/, pp. 1-2.
Asguard Networks, Inc., "SimpleConnectTM Product Information," Retrieved on Nov. 9, 2012, from http://www.asguardnetworks.com/product/, p. 1.
Asguard Networks, Inc., "SimpleConnectTM Quick Start Documentation Guide," Revision 1, Dec. 13, 2012, pp. 1-18.
Asguard Networks, Inc., "Welcome to Asguard Networks," Retrieved on Oct. 23, 2012, from http://www.asguardnetworks.com/, p. 1.
Benyamina et al., "Wireless Mesh Networks Design—A Survey," IEEE Communications Survey & Tutorials, vol. 14, No. 2, Second Quarter 2012, pp. 299-310.
Office Communication for U.S. Appl. No. 15/670,859 mailed on May 10, 2019, 2 Pages.
Office Communication for U.S. Appl. No. 15/994,760 mailed on Oct. 11, 2018, 02 Pages.
Office Communication for U.S. Appl. No. 16/562,258 mailed on Apr. 22, 2022, 10 Pages.
Office Communication for U.S. Appl. No. 15/994,760 mailed on Oct. 18, 2018, 02 Pages.
Office Communication for U.S. Appl. No. 17/079,248 mailed Feb. 17, 2021, 7 Pages.
Office Communication for U.S. Appl. No. 14/204,907 mailed Apr. 22, 2016, 02 Pages.
Office Communication for U.S. Appl. No. 14/814,283 mailed on Jun. 3, 2016, 10 Pages.
Office Communication for U.S. Appl. No. 15/083,214 mailed on Oct. 25, 2016, 11 Pages.
Office Communication for U.S. Appl. No. 15/670,859 mailed on Nov. 26, 2018, 11 Pages.
Office Communication for U.S. Appl. No. 16/221,145 mailed on Aug. 24, 2021, 11 Pages.
Office Communication for U.S. Appl. No. 16/221,145 mailed on Jul. 25, 2022, 9 Pages.
Office Communication for U.S. Appl. No. 16/221,145 mailed on Sep. 10, 2020, 11 Pages.
Office Communication for U.S. Appl. No. 16/562,258 mailed on Aug. 20, 2021, 11 Pages.
Office Communication for U.S. Appl. No. 16/562,258 mailed on Sep. 8, 2020, 11 Pages.
Office Communication for U.S. Appl. No. 17/246,520 mailed on Mar. 31, 2023, 10 Pages.
Office Communication for U.S. Appl. No. 14/204,907 mailed on Dec. 2, 2015, pp. 1-14.
Office Communication for U.S. Appl. No. 15/156,254 mailed on Dec. 30, 2016, 13 Pages.
Office Communication for U.S. Appl. No. 15/156,254 mailed on Oct. 19, 2017, 13 Pages.

(56) References Cited

OTHER PUBLICATIONS

Henderson, T. et al., "HIP-based Virtual Private LAN Service (HIPLS)," Network Working Group, Internet-Draft, The Boeing Company, Nov. 6, 2012, pp. 1-16.

International Preliminary Report on Patentability for International Patent Application No. PCT/US2014/023632 mailed Sep. 24, 2015, 12 Pages.

International Preliminary Report on Patentability for International Patent Application No. PCT/US2015/042993 mailed Feb. 9, 2017, 8 Pages.

International Search Report and Written Opinion for International Patent Application No. PCT/US2014/023632 mailed Jun. 23, 2014, 13 Pages.

International Search Report and Written Opinion for International Patent Application No. PCT/US2015/042993 mailed Nov. 11, 2015, 09 Pages.

Lawton, George, "Machine-to-Machine Technology gears up for growth", 2004, IEEE Computer Society, pp. 12-15.

Office Communication for U.S. Appl. No. 14/814,283 mailed on Nov. 21, 2016, 10 Pages.

Office Communication for U.S. Appl. No. 14/814,283 mailed on Nov. 30, 2015, pp. 1-8.

Office Communication for U.S. Appl. No. 15/083,214 mailed on Jul. 7, 2016, 11 Pages.

Office Communication for U.S. Appl. No. 15/201,063 mailed on Nov. 2, 2016, 11 Pages.

Office Communication for U.S. Appl. No. 15/670,859 mailed on Jun. 29, 2018, 10 Pages.

Office Communication for U.S. Appl. No. 15/670,925 mailed on Apr. 5, 2018, 09 Pages.

Office Communication for U.S. Appl. No. 16/172,621 mailed on Mar. 17, 2020, 7 Pages.

Office Communication for U.S. Appl. No. 16/221,145 mailed Apr. 13, 2020, 7 Pages.

Office Communication for U.S. Appl. No. 16/221,145 mailed on Apr. 26, 2022, 11 Pages.

Office Communication for U.S. Appl. No. 16/221,145 mailed on Mar. 24, 2021, 9 Pages.

Office Communication for U.S. Appl. No. 16/267,166 mailed Jan. 14, 2020, 5 Pages.

Office Communication for U.S. Appl. No. 16/562,258 mailed on Apr. 7, 2020, 10 Pages.

* cited by examiner

*1600*

START

PROVIDE NETWORK TRAFFIC INFORMATION
TO MANAGEMENT PLATFORM                    1602

MODIFY GROUPS?                    1604

NO

YES

DETERMINE CANDIDATE POLICIES FOR NEW
GROUPS BASED ON GROUP MEMBERS
CLASSIFICATION                    1606

DEPLOY CONFIRMED POLICIES TO GATEWAYS
ASSOCIATED WITH NEW ENTITIES          1608

RETURN

POLICY BUILDER FOR OVERLAY NETWORKS

TECHNICAL FIELD

The present innovations disclosed herein relate generally to network management, and more particularly, but not exclusively, to determining network policies for overlay networks.

BACKGROUND

Typical network communication protocols, such as, Internet Protocol (IP) deliver network packets from a source host to a destination host based on an IP address. Traditionally, IP addresses have served a dual purpose as a host's identity and location. This has led to challenges securing the various hosts and networks in modern distributed networking environments including diverse or heterogenous environments, such as building management systems.

For instance, network packets often include a source network address that may be used by the target host to address and route return packets. However, in some cases target hosts may use the source network address to determine the identity of the source host. In some cases, this dual use may cause networks or services to be vulnerable to man-in-the-middle attacks based on network packets that include false or spoofed network addresses. Other security challenges enabled in part by this dual role of network addresses may include denial of service attacks, replay attacks, or the like. Also, since modern computing environments often employ ephemeral and/or non-unique network addresses, using network address to provide host identity poses challenges, as modern hosts, e.g., cell phones, frequently change location on the network. In some cases, overlay networks may be employed to layer a logical network (the overlay network) on conventional underlay networks. In some cases, converting conventional networks to overlay networks may be difficult because of various challenges associated with deploying overlay networks, including, one or more of lack of visibility of entities in the network, issues associated with wholesale configuration changes, policy determination/assignments, or the like. Thus, it is with respect to these and other considerations that these innovations are made.

SUMMARY

Various embodiments are directed to managing communication over a network. In one or more of the various embodiments, one or more entities may be classified based on one or more characteristics of the one or more entities and one or more portions of network traffic in an underlay network.

In one or more of the various embodiments, one or more policies for an overlay network may be generated based on one or more of the one or more classified entities or the one or more portions of the network traffic.

In one or more of the various embodiments, the one or more policies may be deployed to one or more gateways that may be associated with the one or more entities such that the one or more gateways facilitate access by the one or more entities to the overlay network based on the one or more policies.

In one or more of the various embodiments, in response to identifying one or more other entities in the underlay network based on other network traffic in the overlay network and the network traffic in the underlay network, further may be performed including: updating the one or more policies based on the other network traffic in the overlay network, the network traffic in the underlay network, or the one or more other entities; deploying the one or more updated policies to the one or more gateways or one or more other gateways such that the one or more gateways facilitate access by the one or more other entities to the overlay network based on the one or more updated policies.

In one or more of the various embodiments, one or more candidate policies for an overlay network may be generated based on one or more of the one or more classified entities or the one or more portions of the network traffic such that the one or more policies are generated based on the one or more candidate policies.

In one or more of the various embodiments, the one or more classified entities maybe grouped into one or more groups based on one or more of the one or more characteristics of the one or more classified entities, the network traffic in the underlay network, or the other network traffic in the overlay network. In some embodiments, the one or more policies may be associated with the one or more groups such that the one or more classified entities may be facilitated to access to the overlay network based on the one or more policies associated with a group that includes the one or more entities.

In one or more of the various embodiments, deploying the one or more policies to the one or more gateways may include modifying one or more network parameters of the one or more entities such that the one or more modified network parameters cause the one or more entities to provide requests to one or more target entities (target nodes) in the overlay network via the one or more gateway computers.

In one or more of the various embodiments, in response to determining that the one or more entities communicate with one or more external entities that are located outside of a local portion of the underlay network, modifying the one or more policies to facilitate the one or more entities to communicate with the one or more external entities.

In one or more of the various embodiments, monitoring network traffic in the underlay network such that monitoring network traffic includes one or more of passive monitoring of the network traffic, inspection of protocol headers associated with the monitored network traffic, or deep inspection of one or more network packets associated with the monitored network traffic.

In one or more of the various embodiments, modifying the one or more policies based on a data structure which defines one or more of a computer, a device, a service, or an application as being associated with the one or more entities.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
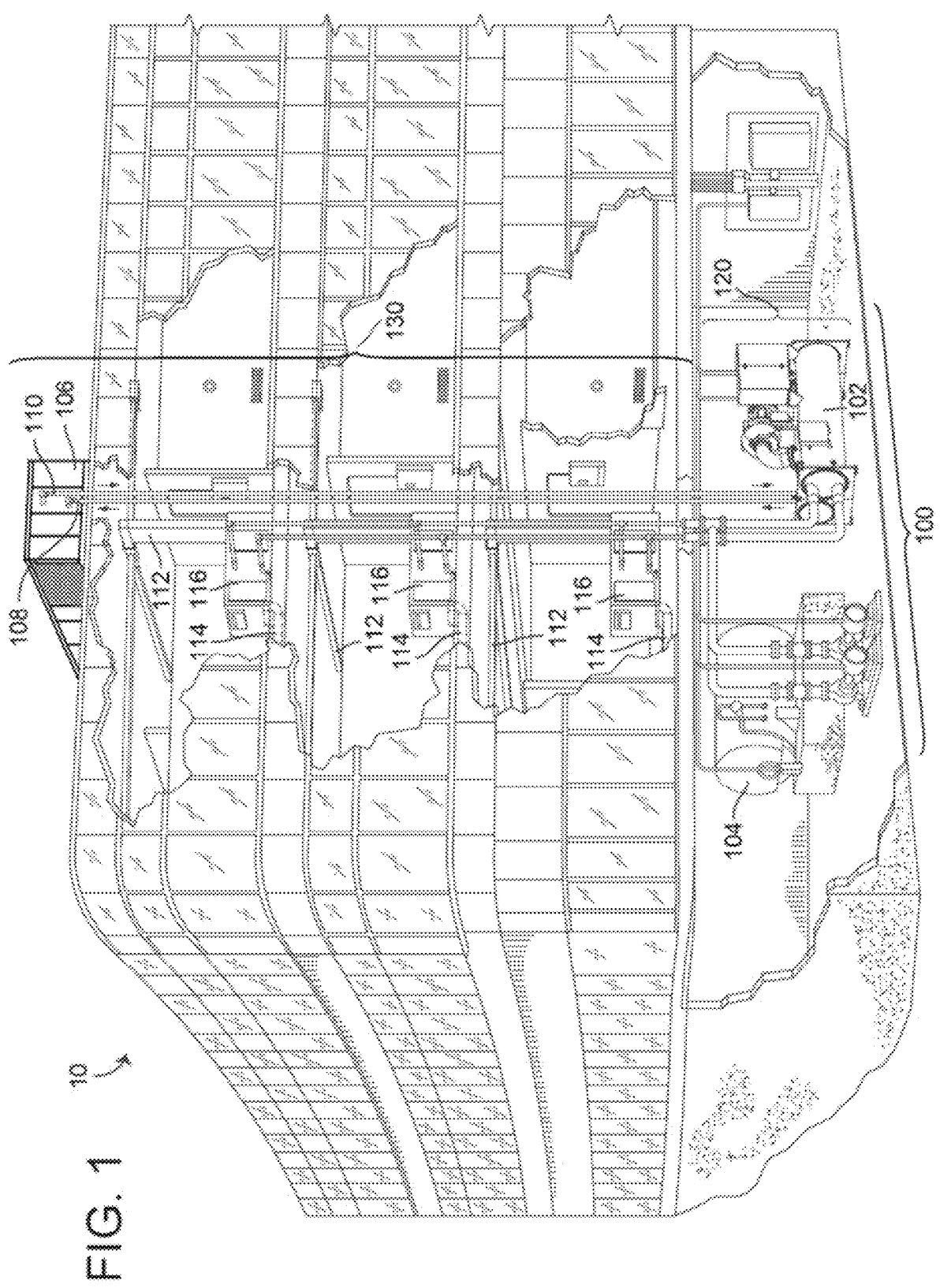
FIG. 1 illustrates an exemplary building management system (BMS) and HVAC system in which the systems and methods of the present disclosure may be implemented.

Various embodiments now will be described more fully hereinafter with reference to the accompanying drawings, which form a part hereof, and which show, by way of illustration, specific exemplary embodiments by which the innovations disclosed herein may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "overlay network," "mesh network," or "industrial network" refer to a network of industrial computer/machines, workstations, client computers, building management systems, gateway computers, or the like. The term mesh network used herein describes both the typical network topology of a network in an industrial operation environment as well as more generally, networked systems used to perform operations in industrial or commercial environments, such as, managed buildings, factory floors, manufacturing complexes, oil refineries, or the like. In the interest of clarity such networks (including machines and computers on the network) are referred to as overlay networks even when their topology or configuration is not strictly a mesh network or partial mesh network.

As used herein the terms "physical network," or "underlay network" refer to the actual communication networks that interconnect one or more computers or networks. The physical network may be a physical or native network device/components used to connect one or more computers or industrial devices (machines) in a network. Physical networks include network interfaces, wire, wireless hotspots, switches, routers, repeaters, or the like, that comprise the physical network Also, physical networks may be considered to include the native communication protocols, network topology, and so on, that may be used to setup an overlay network in various environments. In some cases, physical networks may be arranged to facilitate open communication between node computers, (e.g., machines, workstations, client computers, and so on), gateway computers, management platform computers, relay computers, or the like, that are on the physical network.

As used herein the terms "node," or "node computer" refer to computers that are endpoint computers interconnected over a physical network. Node computers may include client computers, smart phones, video cameras, sensors, network computers, various managed building components (e.g., HVAC components, security systems, or the like), industrial workstations, press machines, robots, packaging machines, automated milling machines, automated printing presses, pumps, valves, boilers, or the like. Node computers are considered to be computers or devices connected to the physical network exclusive of gateway computers, relay computers, management platform server computers, or the like. Nodes gain access to the networks managed management platform via gateway computers, As used herein the terms "source node," or "source node computer" refer to a node computer that is the originating endpoint of a network communication.

As used herein the terms "target node," or "target node computer" refer to a node computer that is the ultimate intended destination of a communication. In some embodiments, a source node computer may be communicating to one or more other node computers over an industrial/overlay network. These intended recipients of these communication may be considered target node computers. Accordingly, a node computer may be a target node computer if it receives communications and it may be a source node computer if it sends communications.

As used herein the terms "gateway," "gateway agent," or "gateway computer" refer to computers connected to a network that are disposed between the node computers and the physical network. Gateway computers may be network computers that may be arranged to provide security, access control, communication routing, or the like, for overlay networks or mesh networks. In some embodiments, gateway computers may be configured by another network computer, such as, a management platform computer. In some cases, gateway agents may be programs installed to facilitate computer or devices to access overlay networks.

As used herein the terms "relay computer," "relay node," or "relay" refer to one or more computers that serve as intermediaries for establishing connections between gateway computers that may be on different networks. In some cases, relay computers may be associated with network addresses that may be reached from more than one network.

As used herein the term "network address" refers to a value or values used for locating an endpoint in a network. In some embodiments, endpoints may include services, networks, network computers, client computers, applications, firewall, router, load balancers, node computers, gateway computers, relay computers, management platform computers, or the like. A network address may be assumed to comprise one or more identifiers that may be recognized by one or more protocols.

As used herein the term "device address" refers to an identifier that may be associated with a network interface. Device addresses may be employed by low level network protocols to communicate network traffic from one network interface to another. Accordingly, devices addresses may be used to send network traffic from one device to another device that are in the same physical network segment. The particular makeup or format of a device address may vary depending on the network protocol being employed. For example, MAC addresses may be used to devices in Ethernet networks, Wi-Fi networks, or Bluetooth networks. Device addresses may be unsuitable for communicating between devices on different networks or different network segments for various reasons including an absence of routing information or network topology information.

As used herein the term "protocol address" refers to an endpoint identifier that may be associated with devices or interfaces. Protocol addresses may be used to send network packets to other interfaces in the same network segment or to interfaces in other network segments depending on the network protocol and network policies/configuration. Protocol addresses may generally embed information that may be employed to determine a communication path across one or more devices to reach a target or destination device. For example, IP addresses may be considered protocol addresses because devices on different networks that support the IP protocol may communicate with devices on the same network or different network. Protocol addresses assume that a network stack, network devices, or network engines may be facilitated to associate protocol addresses with device addresses. This facilitates the lower-level interface-to-interface communication to determine which interface receives the network traffic without knowledge of the higher level transport protocols that may be operative in a network. In cases where an interface is trying to reach another interface in a different network segment usually by stepping up to high level protocol that can negotiate the traversal across the network segments. Also, in some networking environments, one or more services may be provided that facilitate the discovery of which device address to employ to reach an interface associated with a given protocol address. In some cases, there may be one or more intervening networks that require traversal before the network that includes a target interface may be reached. Accordingly, routing services may provide device addresses that represent a 'next hop' on a path to the target device.

As used herein the term "overlay traffic tunnel" refers to a network connection established through or over one or more underlay networks using a conventional network protocol that provides an overlay network connection between two gateway computers in the overlay network. The traffic in the overlay traffic tunnel is encrypted and opaque with respect to the underlay network.

As used herein the term "configuration information" refers to information that may include rule-based policies, pattern matching, scripts (e.g., computer readable instructions), or the like, that may be provided from various sources, including, configuration files, databases, user input, built-in defaults, or the like, or combination thereof.

The following briefly describes embodiments of the innovations disclosed herein in order to provide a basic understanding of some aspects of the innovations disclosed herein. This brief description is not intended as an extensive overview. It is not intended to identify key or critical elements, or to delineate or otherwise narrow the scope. Its purpose is merely to present some concepts in a simplified form as a prelude to the more detailed description that is presented later.

Example Deployment Environment

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve set point conditions for the building zone.

Figure 2:
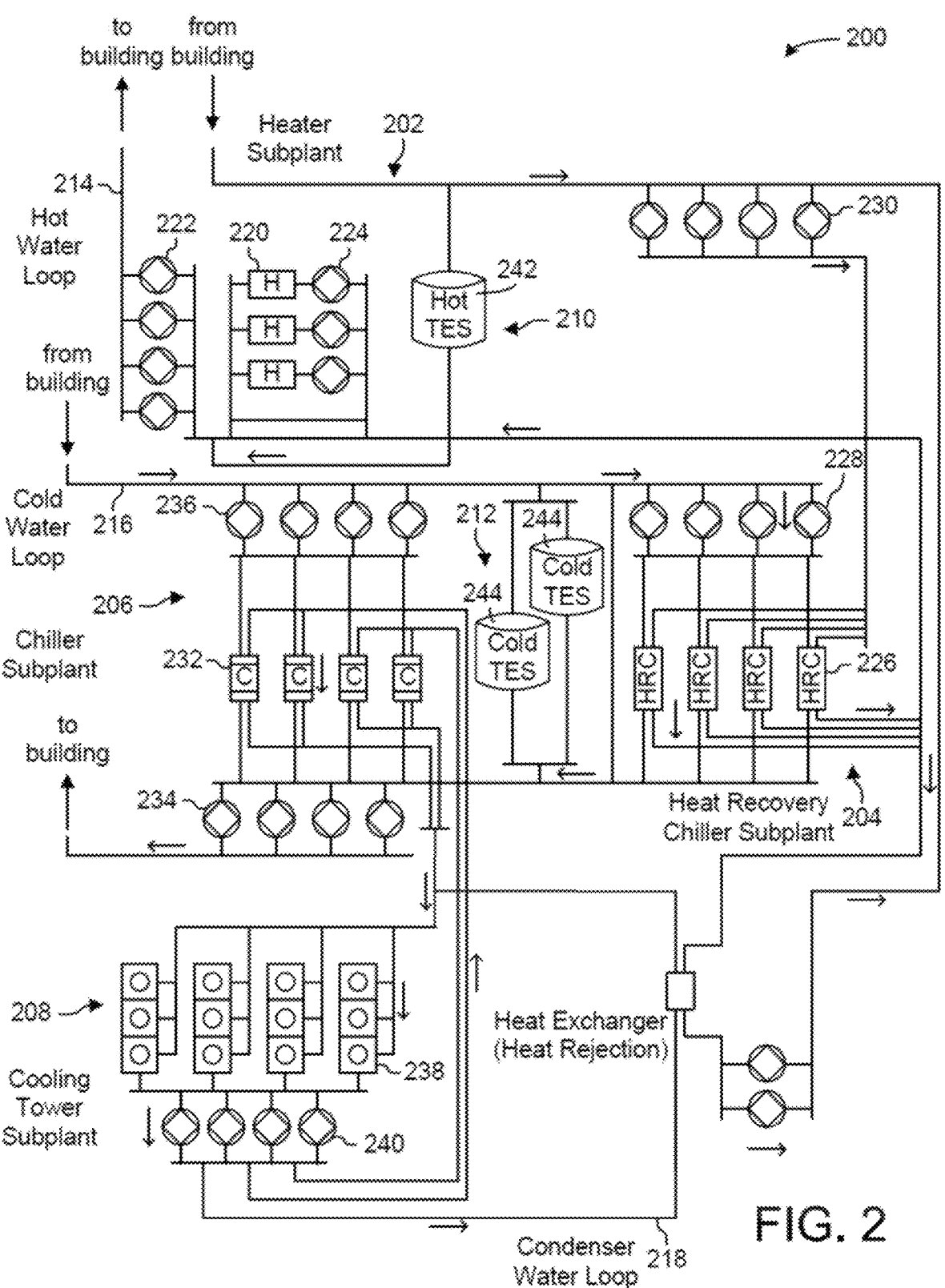
FIG. 2 illustrates an exemplary waterside system for a building management system (BMS) and HVAC system in which the systems and methods of the present disclosure may be implemented.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
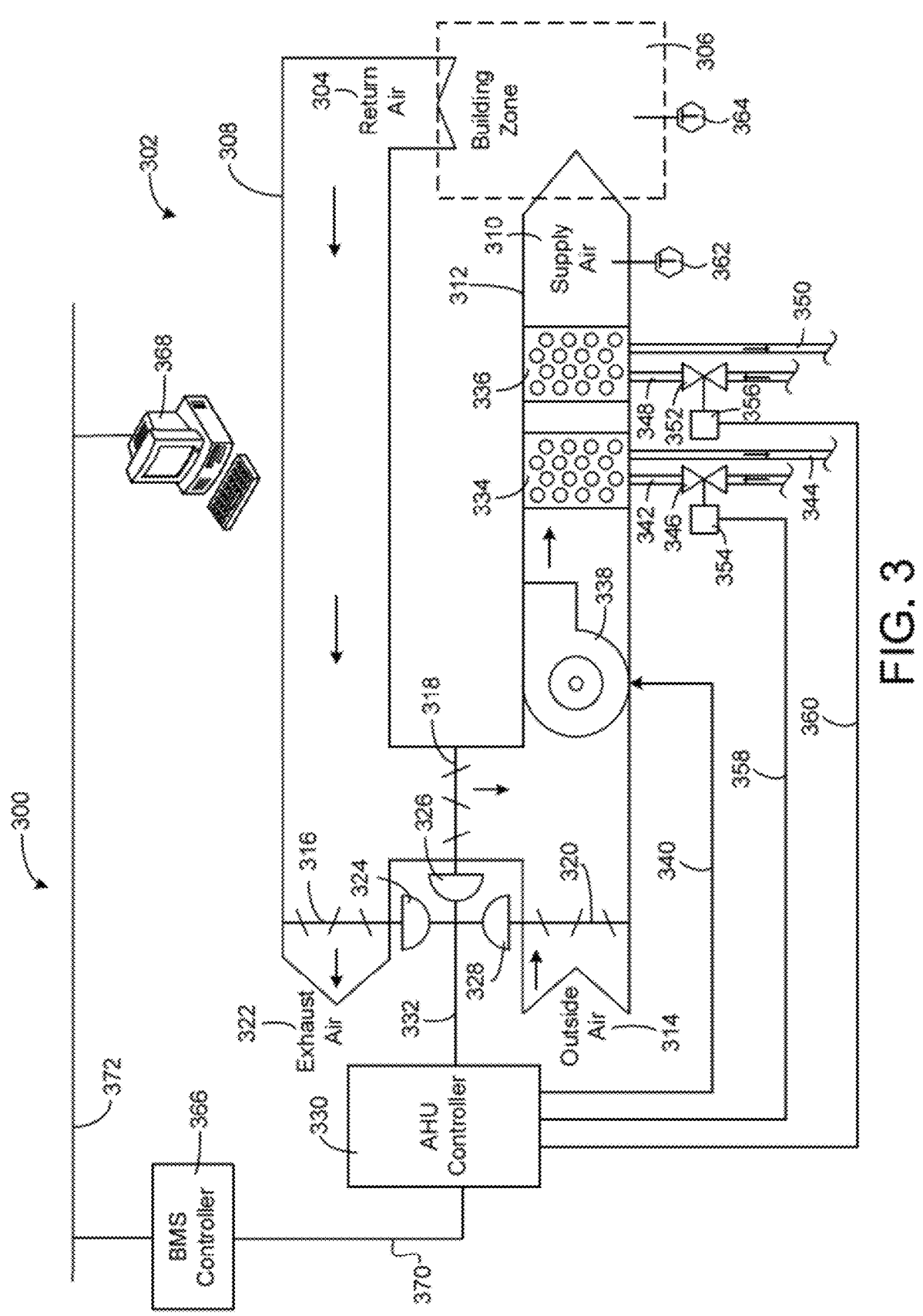
FIG. 3 illustrates an exemplary airside system for a building management system (BMS) and HVAC system in which the systems and methods of the present disclosure may be implemented.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type AHU 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a BMS controller 366 and a client device 368. BMS controller 366 may include one or more computer systems (e.g., servers, supervisory controllers, subsystem controllers, etc.) that serve as system-level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
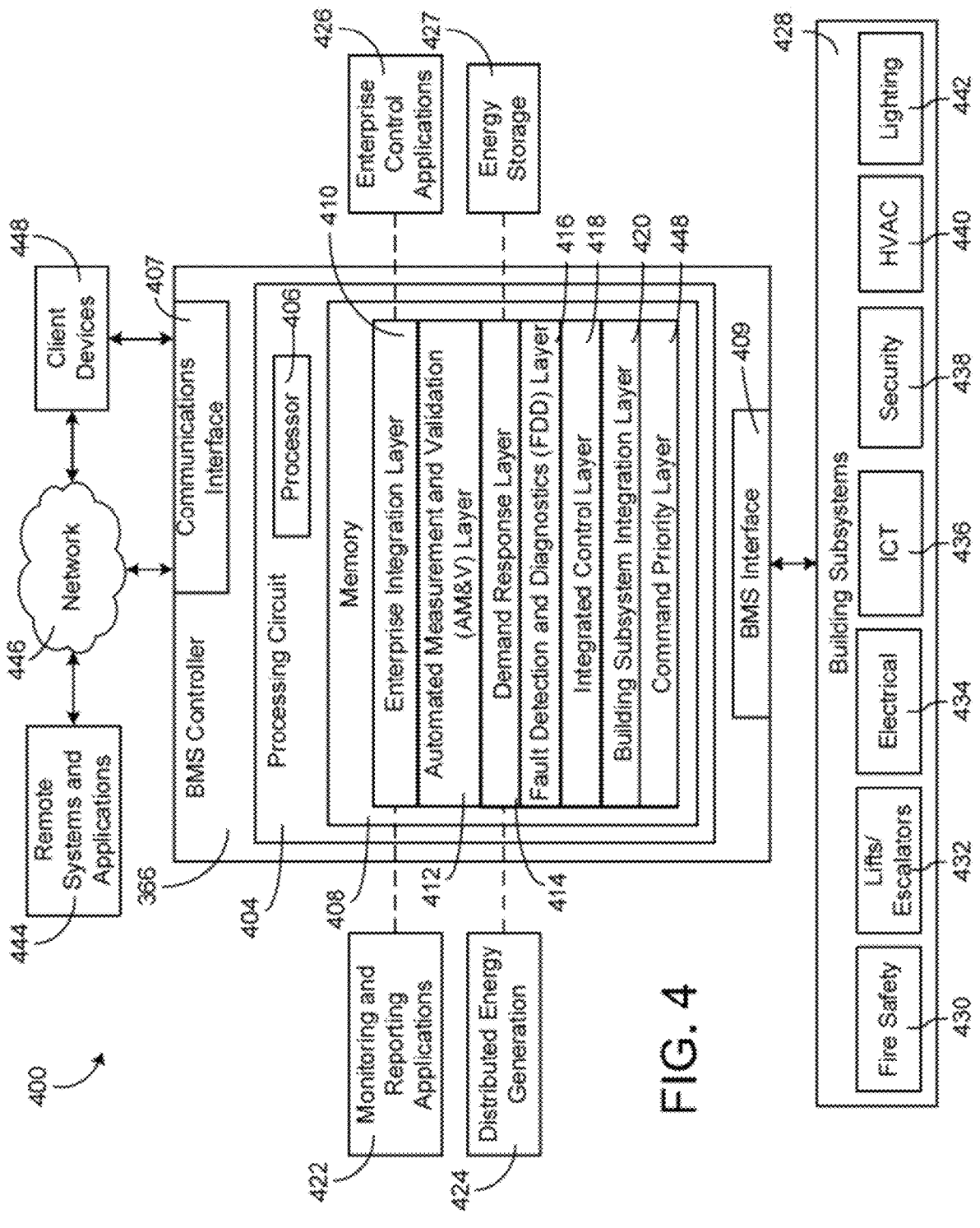
FIG. 4 illustrates an exemplary building management system (BMS) in which the systems and methods of the present disclosure may be implemented.

Referring now to FIG. 4, a block diagram of a BMS 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include any number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407 and 409 may be or may include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407 and 409 may be direct (e.g., local wired or wireless communications) or via a communications network 446 (e.g., a WAN, the Internet, a cellular network, etc.). For example, interfaces 407 and 409 may include an Ethernet card and port for sending and receiving data via an Ethernet-based communications link or network. In another example, interfaces 407 and 409 may include a Wi-Fi transceiver for communicating via a wireless communications network. In another example, one or both of interfaces 407 and 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407 and 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments, BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 may integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions may be communicated back to building subsystem integration layer 420.

Integrated control layer 418 is shown to be logically below demand response layer 414. Integrated control layer 418 may be configured to enhance the effectiveness of demand response layer 414 by facilitating building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and AM&V layer 412. Integrated control layer 418 may be configured to provide calculated inputs (e.g., aggregations) to these higher levels based on outputs from more than one building subsystem.

AM&V layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

FDD layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes may be examined by FDD layer 416 to expose when the system begins to degrade in performance and alert a user to repair the fault before it becomes more severe.

Illustrative Logical System Architecture

Figure 5:
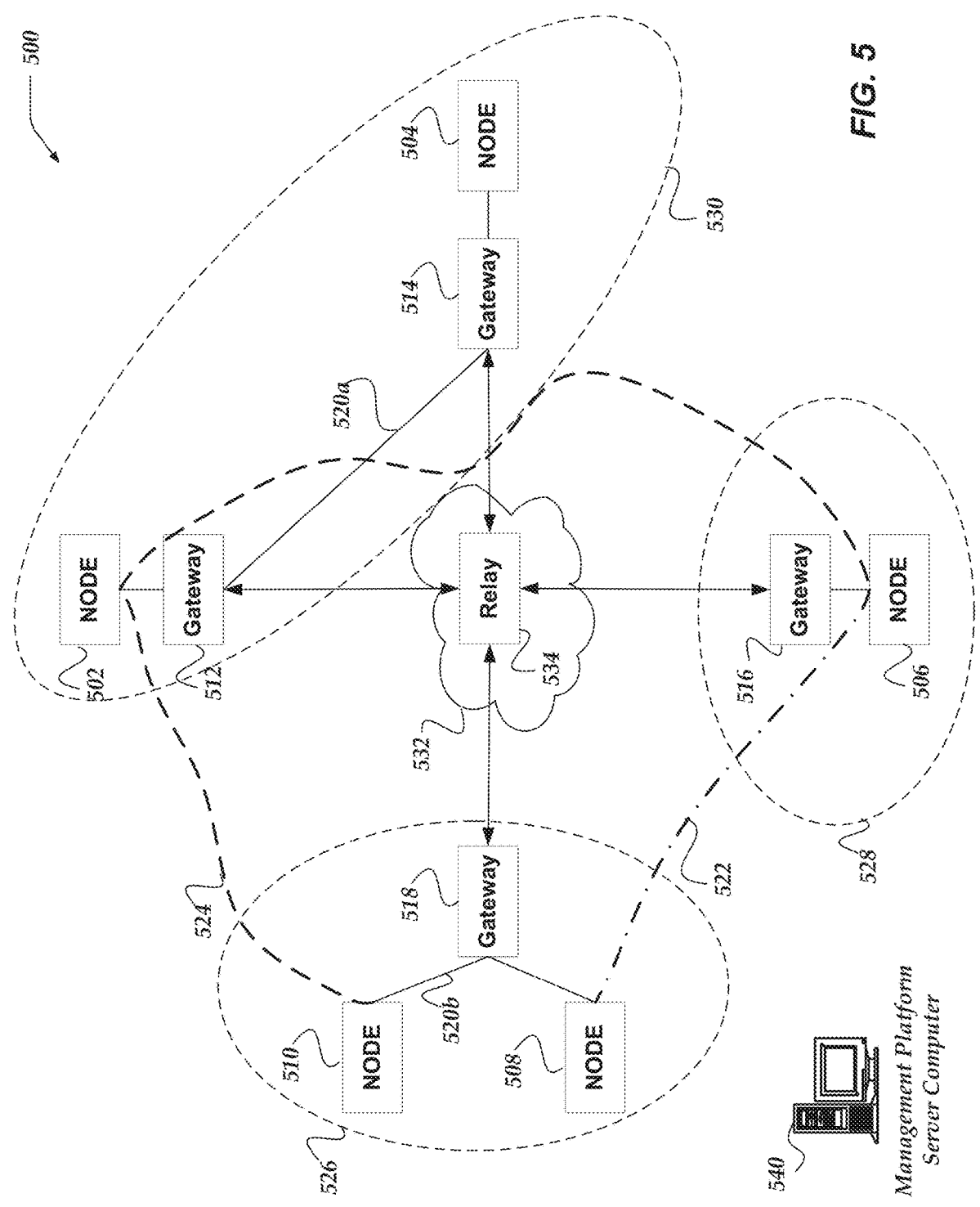
FIG. 5 illustrates a logical schematic of a network that includes overlay networks, node computers, gateway computers, relay computers, or the like, in accordance with at least one of the various embodiments.

FIG. 5 illustrates a logical schematic of network 500 that includes overlay networks, node computers, gateway computers, relay computers, or the like, in accordance with at least one of the various embodiments. Network 500 is arranged to include gateway computers, such as, gateway computers 512-518. Gateway computers may be disposed between one or more node computers and the underlying physical network infrastructure. In at least one of the various embodiments, the gateway computers may be arranged such that they isolate node computers, such as, node computers 502-510 from the physical network used to interconnect them. Also, in this example, management platform server computer 540 represents one or more management platform servers that may be assumed to be arranged to communicate over one or more networks with relay computers or gateway computers that comprise network 500. In one or more of the various embodiments, among other things, management platform server 540 may be arranged to manage the configuration or distribution of policy information to gateway computers, relay computers, or the like.

In this example, physical networks, such as, physical network 520*a*, physical network 520*b*, a public network 532 provide an underlying physical network comprising network 500. In this example, node computer 504 is isolated from physical network 520*a* by gateway computer 514.

Also, in one or more of the various embodiments, private networks, such as, private network 526, private network 528, or private network 530 may represent separate or isolated networks that may be configured to prevent computers from being visible or directly accessible from outside each of the private networks.

In some embodiments, gateway computers may be arranged to communicate with one or more relay computers, such as, relay computer 534 via another network, such as, network 532. In some embodiments, relay computer 534 may be arranged to have a network address that may be visible from computers that may be part of other networks, including private networks, such as, private network 520*a* and private network 520*b*, or the like.

Accordingly, in at least one of the various embodiments, the gateway computers may be configured to provide or enforce one or more overlay networks in network 500. In this example, for some embodiments, overlay network 522 facilitates node computer 506 and node computer 508 to "see" each other on the network; communication from node computer 506 to node computer 508 may be routed through gateway computer 516 to network 532 to relay engine 534 to gateway computer 518; and the communication may then be routed from gateway computer 518 to node 508 over private network 520*b*. From the point-of-view of node computer 506 and node computer 508 the communication appears to go directly over overlay network 522. In actuality the communication will be routed from node 506 to gateway computer 516 to relay engine 532 to gateway computer 518.

Likewise, in this example, network 500 may be arranged such that node computer 502, node computer 506, and node computer 510 communicate over overlay network 524. As described above, in at least one of the various embodiments, the communication among/between the nodes on overlay network 524 may be routed through relay engine 534 and two or more of the gateway computers.

In at least one of the various embodiments, the gateway computers may be configured with one or more rule-based policies that determine access or restrictions for network communication on the networks. The particular rules or restrictions associated with how network traffic (e.g., network packets) should be routed through the overlay network may be established by a management platform computer, such as management platform server computer 540, or the like. Configuration information may be pushed (e.g., routing tables, or the like) to each gateway computer to define the overlay networks, if any, as well other restrictions that may be applicable for one or more networks.

In at least one of the various embodiments, gateway computers may be arranged to include an explicit list of computer addresses/identities that are allowed to communicate with the gateway computer. In some embodiments, information associated with the underlay network, such as, network domain names, network address prefixes, or the like, may be provided to define some or all of the allowed communication targets. Accordingly, if a node computer, such as, node computer 510 is in gateway computer 518's list of allowed computers (e.g., a whitelist) it may be facilitated to initiate communication over the overlay network through gateway computer 518. Conversely, node computers, or any other computer for that matter, not in a gateway computer's whitelist may be denied access to that gateway computer and the overlay networks. Though, in some embodiments, a node computer may be allowed to access one or more particular gateway computers and denied accessed to others. In at least one of the various embodiments, a management platform computer, such as, management platform server computer 540, may be arranged to manage and distribute the whitelists to the one or more gateway computers.

In at least one of the various embodiments, by placing gateway computers between physical networks (e.g., private network 520*a* or private network 520*b*) and the node computers, the configuration or definition of one or more overlay networks may be accomplished without requiring the individual node computers to be reconfigured. Further, in at least one of the various embodiments, gateway computers may comprise security hardened computers that provide various routing, security or cryptography features to help secure the one or more networks. Otherwise, in at least one of the various embodiments, the network may be reliant on the security features of the node computers themselves which may be non-existent or very limited.

In some embodiments, gateway computers may include multiple gateway links each providing access to one or more networks. In one or more of the various embodiments, gateway links may be arranged to provide secure or redundant access to one or more networks. In some embodiments, one or more gateway links may have access to one or more networks not available or accessible to some or all of the other gateway links.

In at least one of the various embodiments, overlay networks may be enforced by using one or more overlay whitelists that define the endpoints (e.g., node computers, gateway computers, relays computers, or the like) that may be accessed from other members of the overlay network. Accordingly, in at least one of the various embodiments, the computers on a given overlay network may be included on the overlay network whitelist. Likewise, in at least one of the various embodiments, computers absent from the overlay network may be omitted or excluded from the overlay network whitelist. Further, in at least one of the various embodiments, a computer may be included on more than one overlay network whitelist causing it to be part of multiple overlay networks. In at least one of the various embodiments, management platform computer 540 may be arranged to manage and distribute the overlay whitelists to each gateway computer comprising an overlay network.

In some embodiments, computers in different networks may be unable to identify or access each other because their local networks are using separate (perhaps conflicting) network address namespaces. For example, gateway computer 518, and consequently, node computers 508 and 510, cannot be accessed from outside of the private network 520*b* without gateway computer 518 first initiating a connection outside of private network 520*b*. This may be true even if a public network address associated with private network 520*b* is known because the network address of node computers in private networks, such as, private network 520*b* are not generally available to computers outside of the same private networks.

In one or more of the various embodiments, management platforms may be arranged to associate each gateway (including gateway computers or gateway agents) with a gateway identifier (GID). Accordingly, in some embodiments, management platforms may be arranged to assign or enforce policies in the overlay network based on GIDs. In one or more of the various embodiments, GIDs may be associated with network addresses in the underlay network. In some embodiments, if a gateway is associated with a new or different network address, management platforms may be arranged to update its records to associate its GID to the new or updated network address. Thus, in some embodiments, if gateway or its dependent node computer may be moved in the underlay network (or assigned different network addresses) the logical structure or policies in the overlay network may remain consistent without administrator intervention.

In some embodiments, one or more relay computers, such as relay computer 534, may be associated with network addresses that are accessible from computers in one or more private or one or more public networks, in some cases, this may include the public Internet. In one embodiment, a node computer may request that a gateway computer initiate a connection to another node computer via another gateway computer that are located in another network. However, if neither gateway computer can reach the other, because they are both located in separate private networks, one or more relay computers, such as, relay computer 534 may be employed to bridge the networks to facilitate node computers in one network to reach node computers in another network.

In one or more of the various embodiments, while in some cases, gateway computers may be stationary on a network, in that they maintain the same network address indefinitely, the network address for a gateway computer may change from time to time. For example, a gateway computer may be moved to a different location, e.g., to another building on a corporate campus that is associated with a different range of network addresses. Similarly, a gateway that is a mobile device such as a smart phone may pass between cell towers or access points, each of which may be associated with different network addresses. In one or more of the various embodiments, gateway computers may also experience a change in network address if the network changes, e.g., if a new internet service provider (ISP) is introduced. However it happens, if a network address associated with a gateway computer changes, any existing connections using that network address will be dropped. However, because identity based networking does not rely on a host's location as identity, the connection can be seamlessly re-established if management platform server 540 discovers the change and broadcasts the new network address for the gateway computer. For example, if gateway computer 516 determines that its network address has changed, it may notify its associated management platform server of the change. In one or more of the various embodiments, the management platform server may then broadcast updated policies that include rules for the new network address. Also, in some embodiments, gateway computers that experience network address changes may be arranged to actively notify their associated management platform servers of the network address changes. In such cases, for some embodiments, the management platform may authenticate change of address notifications based on gateway computer GIDs that may be included in the notification messages. Accordingly, in one or more of the various embodiments, an existing connection between gateway computer 516 and gateway computer 512 through relay engine 534 may continue once relay engine 534 receives an updated policy from management platform server 540.

It is also possible for a device, such as one of node computers 502, 504, 506, 508, or 510, to be moved to a different gateway computer. In this scenario, management platform server 540 has to be notified of the new configuration before the node computer is to work again properly. For example, if node computer 510 were moved from private network 520b to private network 520a, management platform server 540 could be informed, either manually or automatically, and then update relevant relay engines with new policies. Existing connections may time-out or reset automatically, when it is discovered that endpoint no longer exists at the network address the connection is directed towards. Once a connection has timed-out or reset, a new connection may be initiated and the connection between endpoints may continue uninterrupted.

Also, in some embodiments, services associated with gateway computers may be provided via software based gateway agents that are installed on node computers. Thus, in some embodiments, a node computer may gain access to an overlay network via its on-board gateway agent rather than via a separate physical gateway computer. Further, in some embodiments, gateway computers may be provided by daughtercards, co-processors, embedded into network interfaces, or the like.

Figure 6:
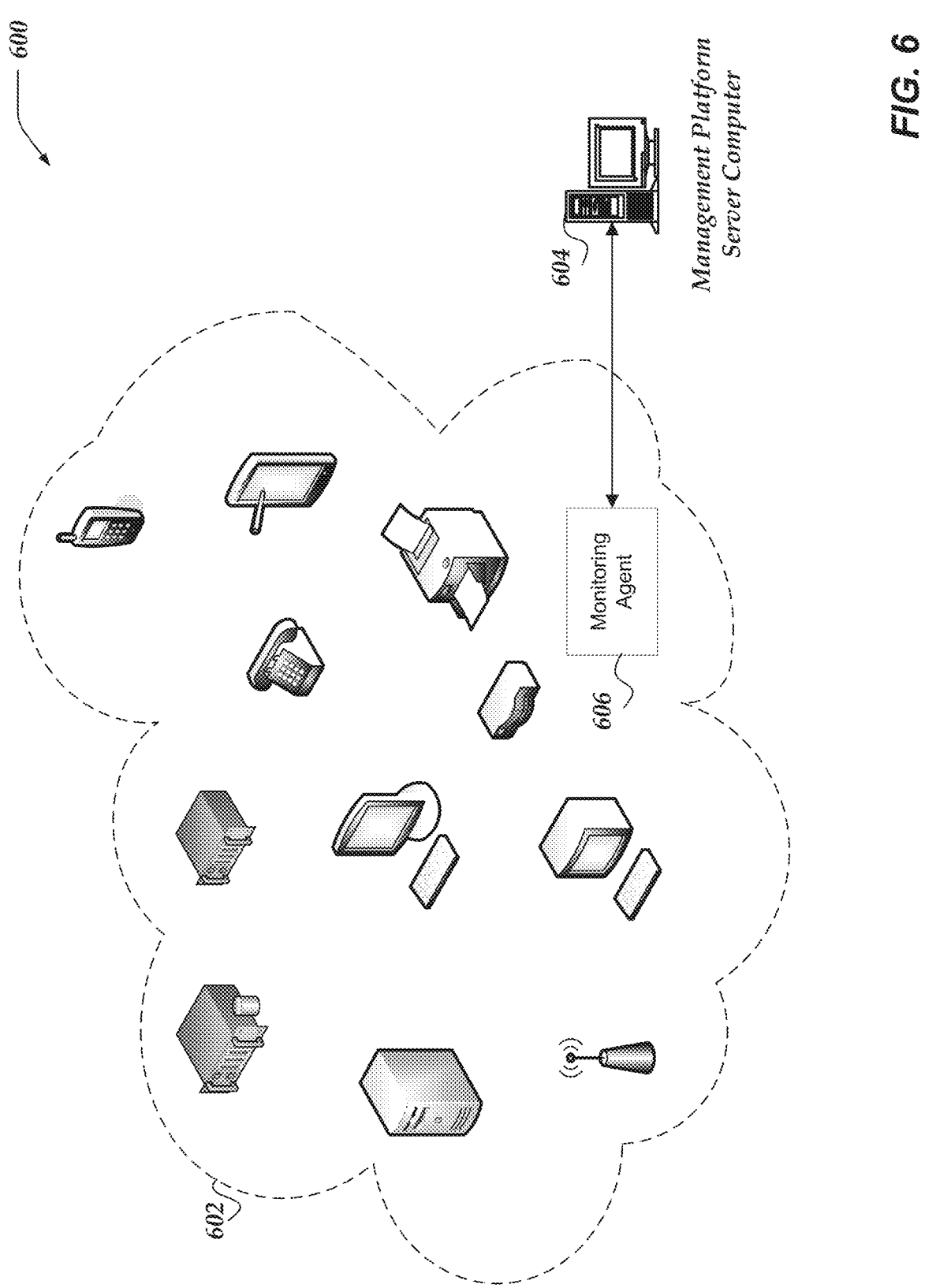
FIG. 6 illustrates a logical schematic of a system for policy builders for overlay networks in accordance with one or more of the various embodiments.

FIG. 6 illustrates a logical schematic of system 600 for policy builders for overlay networks in accordance with one or more of the various embodiments. As described above, overlay networks may be configured to operate on a so-called underlay network, such as, underlay network 602. In some embodiments, underlay networks, such as, underlay network 602 may be considered similar to network 108 or network 110. Also, in some cases, underlay network 602 may be considered a network that facilitates various components in a building to be managed by a building management system as shown in FIGS. 1-4. In some cases, underlay networks may be private networks such that communication or network traffic that may ingress or egress the networks may be restricted, monitored, or otherwise subject to management by one or more network policies. In some embodiments, often underlay networks may be considered full-trust networks such that communication between entities (e.g., computers, devices, applications, servers, or the like) may be relatively unrestricted. Accordingly, in some embodiments, organizations may be limited to relying on configuration of the individual entities for network security or policy enforcement. However, in some embodiments, often unauthorized or unwanted network traffic may be exchanged between entities in full-trust networks even though some or all hosted applications are configured with various security measures, such as, password protection, security certificates, various layer 3 security protocols, or the like. For example, even if database servers are configured to require users (via client programs) to provide valid usernames with valid passwords, this may not protect the database servers from exposure to unauthorized network traffic that may be sent from bad actors in attempts to compromise the computers hosting the protected database servers.

Accordingly, in some embodiments, organizations may be motivated to deploy zero-trust overlay networks to provide improved protection of their networked resources. Zero-trust overlay networks may be considered a software defined network that rides on top of a conventional network (the underlay network). In most cases, zero-trust networks restrict/manage the network traffic that may be exchanged between resources. Typically, zero-trust networks operate by using positive permission/privilege policies that deny communication between all/any resources by default. Accordingly, in some embodiments, organizations may be required by overlay networks to declare one or more policies that explicitly grant privileges, facilitate network traffic exchanges, facilitate resource discovery, or the like.

Thus, in some embodiments, if an organization configures its network resources to communicate via an overlay network, entities in the overlay network may be restricted from communicating unless a particular policy grants permissions that facilitate the communication. Thus, for example, if an unauthorized device gains access the underlay network, it will remain restricted from communicating with resources in the overlay network.

In this example, network 602 may be considered to include several client computers, network computers, network devices, or the like. Note, for brevity and clarity, the individual items in network 602 are not referenced or described individually.

In some cases, organizations that intend to protect their existing networks using zero-trust overlay networks may be faced with many obstacles. In some cases, organizations may not have a clear understanding of the entities in their networks or the communication flows between such entities. For example, recording keeping associated with active networks may be stale or otherwise incomplete. Also, in some cases, one or more entities may have requirements to communicate with entities that may remain outside of the zero-trust overlay network.

Also, in some embodiments, effective deployment of a zero-trust overlay networks may require a clear understanding of which entities may be required to communicate with each other. Thus, in some embodiments, rapidly or immediately switching over from a full-trust underlay network to a zero-trust overlay network may introduce significant foreseen or unforeseen issues, such as, unwanted communication restrictions that may disrupt the operations of an organization. Accordingly, in some cases, organizations may be faced with a choice of configuring their overlay networks to be overly permissive to avoid unwanted communication disruption. For example, deploying a zero-trust network with policies that facilitate every entity to trust each other may be disadvantageous since it introduces risk. Also, even if such disadvantageous policies were attempted (e.g., granting access to all known entities from all known entities), there is likely to be one or more entities that may not be discovered or known such that they may be incorrectly excluded from even very broad policies.

In some embodiments, a policy builder for overlay networks may be arranged to facilitate organizations to discover the entities in their networks and incrementally add them to the overlay network with specific policies. Also, in some embodiments, policy builders for overlay networks may be arranged to recommend or apply one or more policies based on observing the behavior or activity that may occur in the underlay networks or overlay networks. In some embodiments, management platforms may be arranged to determine one or more policies to recommend or apply. Accordingly, in some embodiments, organizations may be relieved from determining effective policies on their own. Thus, in some embodiments, organizations may be facilitated to deploy effective and efficient policies without having to rely on expert administrators or expensive consultants.

In some embodiments, an initial step for deploying overlay networks may include an inventory of the entities and communication relationships in the existing full-trust networks. Accordingly, in some embodiments, management platforms, such as, management platform 604 may be arranged to communicate with one or more monitoring agents, such as, monitoring agent 606. In some embodiments, monitoring agents may be arranged to collect information that may be used by management platforms to discover entities in the networks as well as determine relationships between or among the discovered entities.

In some embodiments, monitoring agents may be separate services hosted such that some or all of the network traffic in networks such as network 602 may be monitored. Also, in some embodiments, monitoring agents may be software agents installed on one or more of the entities in the underlay network. Also, in some embodiments, monitoring agents may be hardware devices or hardware appliances that facilitate network traffic in network 602 to be monitored. Further, in some embodiments, monitoring agents may be arranged to actively probe various services or systems that may provide insight into the entities in the networks or relationships between those entities. Also, in some embodiments, monitoring agents may be arranged to monitor communications that may be directed outside the organization's local networks.

Also, in some embodiments, some of the information collected for determining entities, relationships, or the like, may be collected from or by other monitoring devices in the network, including one or more of routers, network monitoring devices, firewalls, smart switches, application delivery controllers, or the like. Further, in some cases, for some embodiments, if networks may be operating in cloud environments, some or all network information may be provided via one or more tools or APIs provided by the cloud environment vendor. Also, in some embodiments, monitoring agents may be arranged to collect information directly from commercial or custom configuration databases. Further, in some cases, in some embodiments, monitoring agents may be arranged to import data from other sources including, spreadsheets, log files, CSV files, XML files, databases, packet capture, screen scraping monitoring applications, or the like. Also, in some embodiments, monitoring engines may be arranged to collect information from devices in the underlay network (or overlay network) using SNMP. or the like.

Accordingly, in some embodiments, monitoring agents may be arranged to employ libraries, plug-ins, extensions, APIs, rules, instructions, filters, regular expressions, or the like, provided via configuration information to collect information. Thus, in some embodiments, monitoring agents may be arranged to support various local requirements or local circumstances that may be relevant to a particular organization or network.

Accordingly, in some embodiments, monitoring agents may be arranged to communicate the captured entity information or communication information to a management platform such as management platform 604.

In some embodiments, management platforms may include a policy engine (not shown) that processes the information provided by monitoring agents. Accordingly, in some embodiments, management platforms may be arranged to discover, identify, or classify individual entities as well as various communication relationships between the entities.

Figure 7:
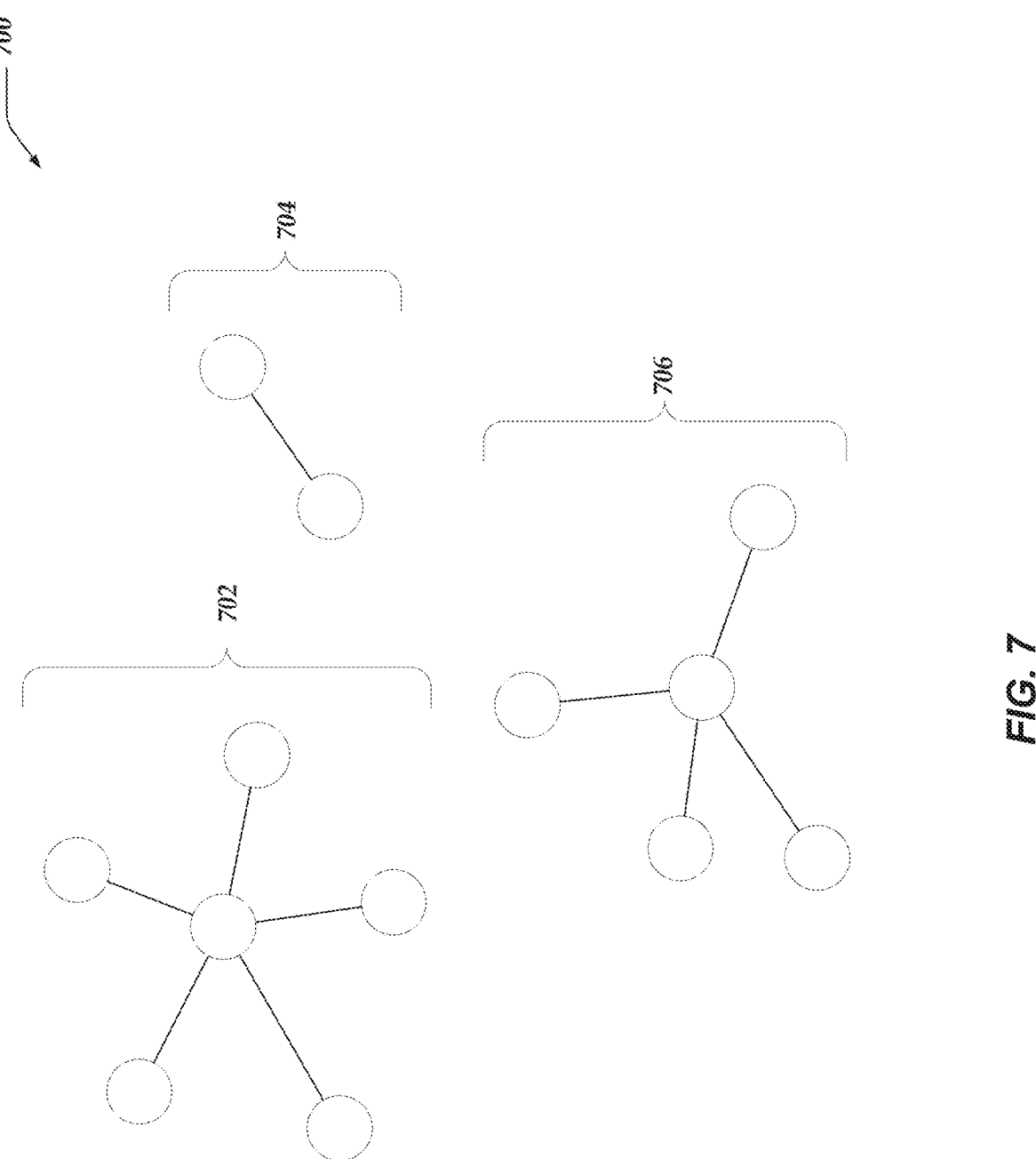
FIG. 7 illustrates a logical schematic of data structures for policy builders for overlay networks in accordance with one or more of the various embodiments.

FIG. 7 illustrates a logical schematic of data structures 700 for policy builders for overlay networks in accordance with one or more of the various embodiments. In one or more of the various embodiments, policy engines may be arranged to discover, identify, or classify individual entities as well as various communication relationships between the entities. In some embodiments, policy engines may be arranged to generate one or more data structures that may represent some or all of the discovered entities or the relationships between them. In some cases, for some embodiments, such data structures may be considered to represent graphs, or the like. Accordingly, in some embodiments, network graphs, such as, network graph 702, network graph 704, network graph 706, or the like, may be generated based on the information collected or provided by monitoring agents.

Accordingly, in this example, for some embodiments, nodes in network graphs may be considered to be entities that have been discovered and classified. In some embodiments, the detail or precision of entity classification may vary depending on the amount or type of network information that may be available. For example, in some cases, management platforms or policy engines may have enough information to infer one or more of specific applications (e.g., PostgresSQL, Database, Apache Web Server, REDIS server, or the like), devices (e.g., switches, routers, firewalls, wireless access points, industrial machines, network attached storage devices, laptops, smart phones, tablets, printers, copy machines, smart speakers, HVAC components, various internet-of-things devices, or the like), operating systems, version information, patch level, hardware characteristics, application classes (e.g., databases, web servers, LDAP servers, or the like), or the like.

Accordingly, in some embodiments, policy engines or management platforms may be arranged to employ one or more libraries, plug-ins, extensions, APIs, rules, instructions, filters, regular expressions, or the like, provided via configuration information to classify or identify network entities based on provided network information. Thus, in some embodiments, policy engines or management platforms may be arranged to support various local requirements or local circumstances that may be relevant to a particular organization or network. For example, in some embodiments, if an organization may be aware that their network includes one or more peculiar (e.g., custom, rare, unsupported, obsolete, or the like) devices, customized rules, custom libraries, or the like, may be provided to facilitate monitoring agents, policy engines, or management platforms to identify or otherwise classify those devices.

Further, in some embodiments, policy engines or management platforms may be arranged to infer the relationship between various entities. Accordingly, in some embodiments, edges of network graphs may be considered to represent communication relationships between entities. Similar to how entities may be classified, policy engines may be arranged to classify communication relationships based on various characteristics, such as, communication protocols, application protocols, frequency of communication, amount of network traffic, density of traffic, directional balance, time-of-day of traffic, source or target of the network traffic, external or internal traffic, or the like.

In one or more of the various embodiments, policy engines may evaluate if the communication relationships may be consistent with the type of entity. For example, if an entity may be a database server, a normal communication relationship with clients may be expected to be asymmetrical such that a small amount of traffic sent from clients may often result in larger amounts of data sent in response.

Accordingly, in some embodiments, network graphs, such as, network graph 702, network graph 704, network graph 706, or the like, may represent a logical topography of a network rather than its physical topography. For example, in this example, network graph 702, network graph 704, and network graph 706 are illustrated as being unconnected with each other because policy engines may determine that the underlying entities do not communicate with each other. Thus, in this example, for some embodiments, even though each represented entity may be in the same physical network they may be represented by the network graphs as being unconnected.

Further, in some embodiments, the determination of network graphs for an organization's networks may be a gradual or progressive process such that the network graphs may be adapted dynamically as information about the network may be discovered.

Figure 8:
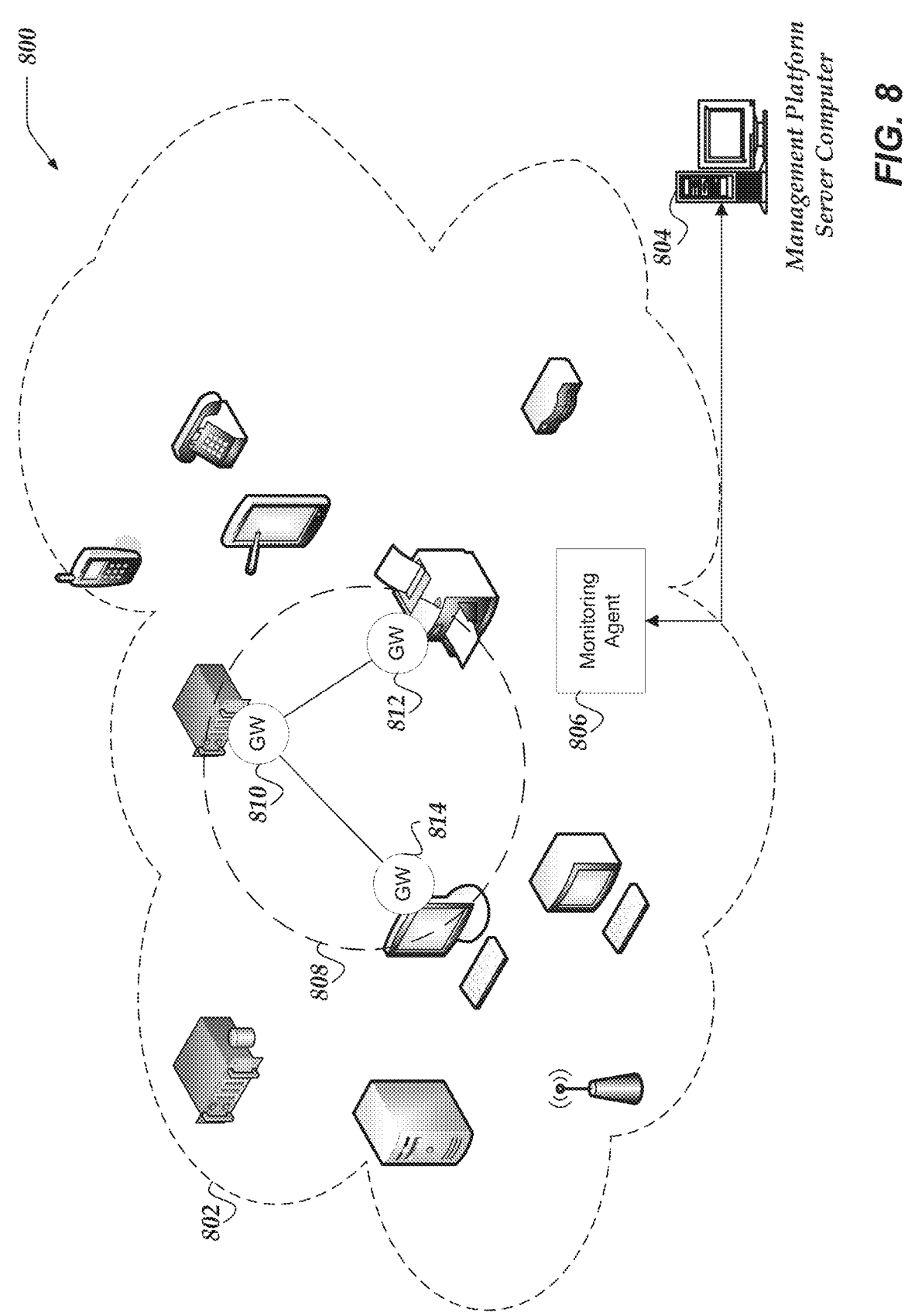
FIG. 8 illustrates a logical schematic of a system for policy builders for overlay networks in accordance with one or more of the various embodiments.

FIG. 8 illustrates a logical schematic of system 800 for policy builders for overlay networks in accordance with one or more of the various embodiments. This figure may be considered similar to FIG. 6 described above. However, in this example, for some embodiments, monitoring agents may be assumed to have collected some information about network 802 and its included entities. Accordingly, in some embodiments, policy engines on management platform 804 may be in the process of classifying entities, classifying relationships, or the like, that have been discovered.

In some embodiments, policy engines may be arranged to facilitate one or more discovered entities to be added to an overlay network with one or more policies that facilitate the one or more entities to communicate via the overlay network. In some embodiments, policy engines may be arranged to recommend one or more policies that may facilitate one or more groups of entities to communicate with one or more other entities.

In some embodiments, policy engines or management platforms may be arranged to assign classified entities identifiers that may be separate from the network address (e.g., IP address, MAC address, hostname, or the like) associated with the entities. Accordingly, in some embodiments, policies or other overlay network attributes may be associated with an entity based on its identifier rather just its network address. Thus, in some embodiments, if the network address of an entity may change, its overlay network policies may remain in effect because its identity with respect to the overlay network may remain unchanged.

In one or more of the various embodiments, policy engines may be arranged to determine one or more appropriate policies based on the characteristics of the entities or relationship between entities. In some embodiments, policy engines may be arranged to automatically assign one or more policies to one or more entities. Also, in some embodiments, policy engines may be arranged to determine one or more candidate policies that may be presented to a user for confirmation. In some embodiments, candidate policies may be associated with a timer or timeout such that they may be automatically applied if the timer expires absent user intervention.

In one or more of the various embodiments, policy engines may be arranged to activate one or more gateway computers that may be associated with one or more entities to enforce the policies. In some embodiments, gateway computers may actually be gateway agents installed on various entities in the network. Also, in some embodiments, gateway computers may be separate computers or devices that may be connected to one or more entities in the network. In some embodiments, management platforms may be arranged to provide a locally accessible application or web page that may facilitate an administrator to request that gateway agents be provisioned for a particular computer or device. For example, in some embodiments, an authorized user may access a management platform via a web page, or the like, to request a gateway agent be installed on a computer. Accordingly, for example, if receiving such a request, the management platforms may provide a link that facilitates the administrator to download and install a gateway agent from the management platform or other local repository. Thus, in some embodiments, if the gateway agent may be installed successfully, the gateway agent may communicate with its management platform to obtain its policy information. In some cases, for some embodiments, management platforms may be configured to integrate with one or more centralized application delivery systems that facilitate organizations management platforms to automatically install or provision gateway agents.

Accordingly, in some embodiments, entities discovered in the underlay network may be progressively joined with an overlay network. In this example, for some embodiments, overlay network 808 may be in the process of being progressively deployed using gateway 810, gateway 812, and gateway 814. Thus, in this example, the three corresponding entities may communicate if they follow their overlay network policies. For example, in some embodiments, a computer associated with gateway 814 may communicate with a server associated with gateway 810 but not directly with the printer associated with gateway 812. However, in some embodiments, some or all of the entities included in overlay network 808 may still be facilitated to communicate with other entities in network 802 even though they may not be included in the overlay network.

Figure 9:
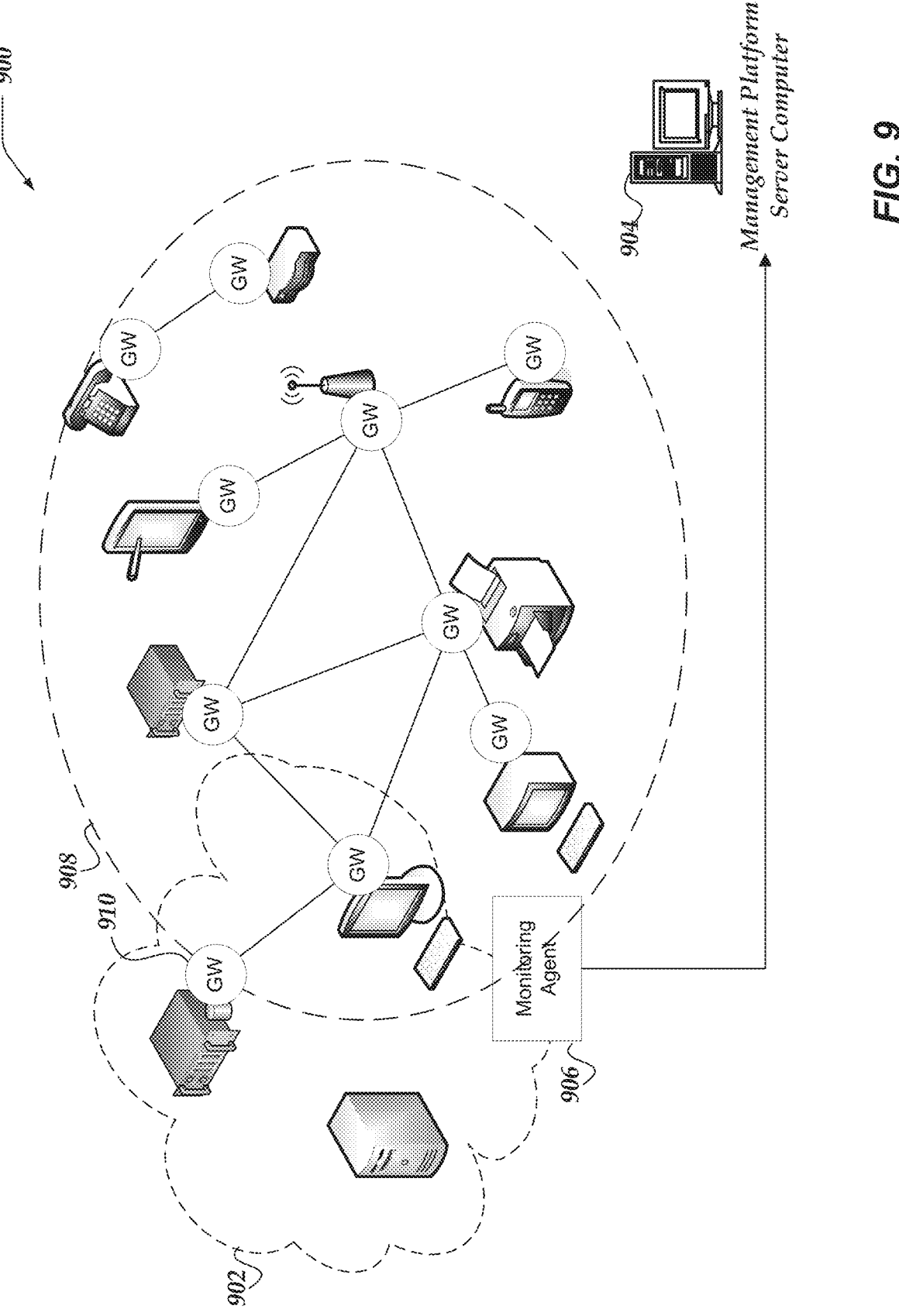
FIG. 9 illustrates a logical schematic of a system for policy builders for overlay networks in accordance with one or more of the various embodiments.

FIG. 9 illustrates a logical schematic of system 900 for policy builders for overlay networks in accordance with one or more of the various embodiments. This figure may be considered similar to FIG. 8 described above. However, in this example, for some embodiments, an overlay network (e.g., overlay network 908) has been progressively expanded to include more entities. Further, this example illustrates monitoring agent 906 as straddling overlay network 908 and underlay network 902. In this example, for some embodiments, this may be considered to represent how monitoring agents may be arranged to continuously monitor network traffic or other activity in overlay network 908 or underlay network 902.

Further, in this example, for some embodiments, gateway 910 is illustrated as straddling overlay network 908 and underlay network 902 which may be considered to indicate that computers associated with gateway 910 may be facilitated to communicate with one or more entities that may be in underlay network 902 rather than being limited to communicating with entities in overlay network 908.

Accordingly, in some embodiments, policy engines may be arranged to determine that one or more entities may be regularly communicating with one or more entities that may not be available or otherwise suitable for including in an overlay network. In some embodiments, an entity in the overlay network may be required to communicate with one or more entities that may be controlled or managed by a third-party. For example, an operating system vendor may provide automatic updates or security patches via services accessed over the internet. Accordingly, in some embodiments, if an organization intends to facilitate computers to automatically receive regular updates or security patches, policies or policy carve-outs may be provided that facilitate the one or more entities in the overlay network to communicate with the update service even though the update service is not considered to be in the overlay network.

Figure 10:
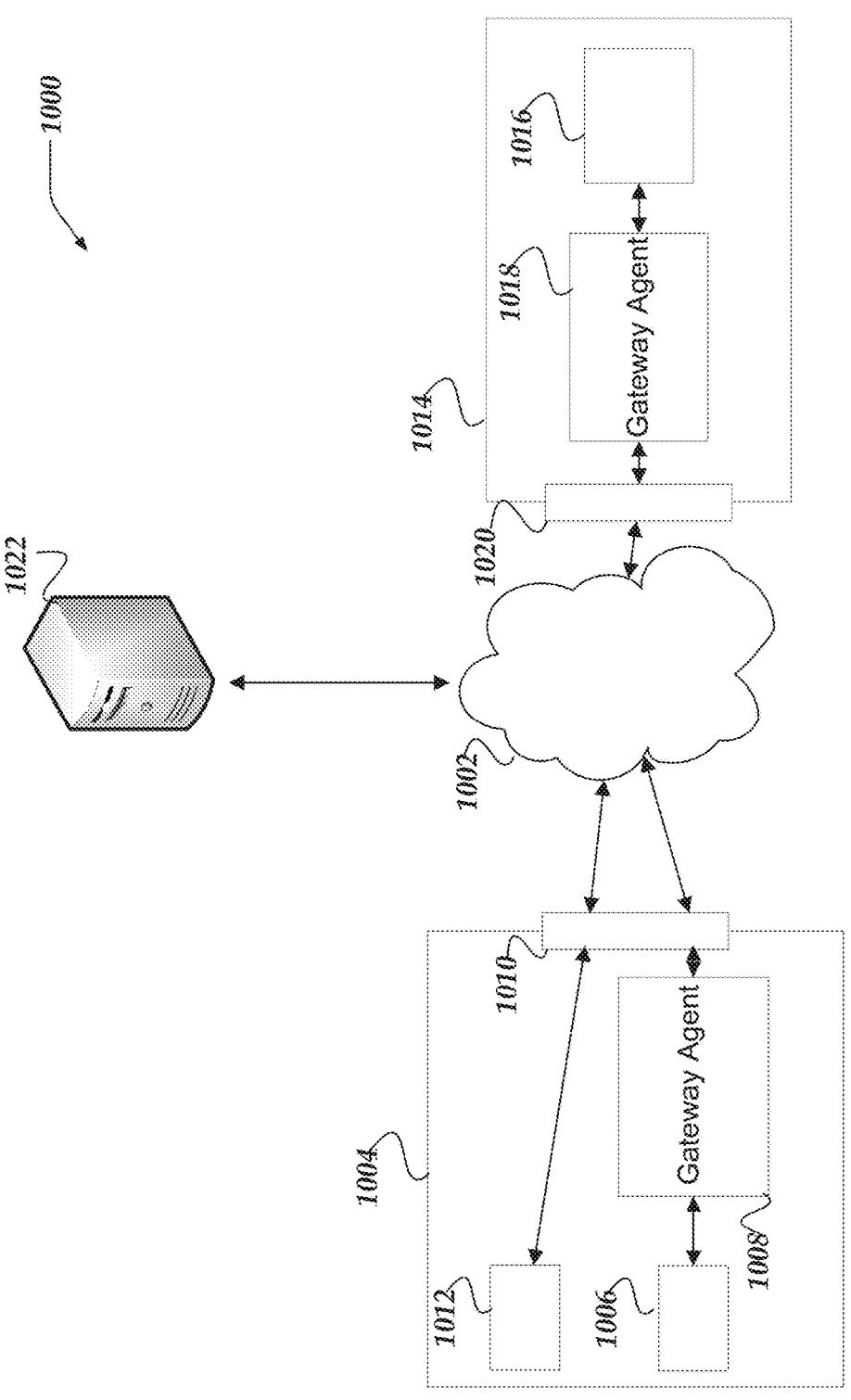
FIG. 10 illustrates a logical schematic of a system for policy builders for overlay networks in accordance with one or more of the various embodiments.

FIG. 10 illustrates a logical schematic of system 1000 for policy builders for overlay networks in accordance with one or more of the various embodiments. As described above, entities that may be ostensibly in an overlay network may be provided policies that facilitate communication with entities (or services) that may not be included in the overlay network. Accordingly, in some embodiments, system 1000 may include network 1002, overlay network node computer 1004, application 1006, gateway agent 1008, application 1012, network interface 1010, node computer 1014, application 1016, gateway agent 1018, network interface 1020, and service computer 1022.

In one or more of the various embodiments, node computers, such as, node computer 1004 or node computer 1014 may be arranged to join overlay networks while retaining their original or current network address. Accordingly, in some embodiments, one or more applications or services on node computers may retain access to one or more services/endpoints in the underlay network. Further, in some embodiments, joining a node computer to an overlay network may not require a separate network interface. As represented here, gateway agent 1008 and application 1012 may be arranged to share network interface 1010.

In one or more of the various embodiments, traffic from applications, such as, application 1006 that may be intended for entities in the overlay network may be routed to or through a gateway agent that may be configured to use network interface 1010 to access the overlay network. Note, as described above, the overlay network may be considered to be a secure software defined network that is overlaid on the devices or networks of the underlay network. However, routing tables or other local network infrastructure configuration may direct overlay network traffic to endpoints in the underlay network that provide secure virtual tunnels to implement the overlay network.

In some embodiments, overlay network policies may be configured to facilitate node computers (or other protected devices) to communicate via secure tunnels to other node computers in the overlay network. Accordingly, in some embodiments, an endpoint in the overlay network may be disabled from communicating with other endpoints in the overlay network absent a particular policy that facilitate the communication. In contrast, in most configurations, the underlay network may facilitate any or most endpoints in a network to communicate with other endpoints.

In one or more of the various embodiments, management platforms may provide a policy that facilitates one or more applications on node computer to communicate with one or more endpoints that may be outside of the overlay network. In some cases, for some embodiments, this may facilitate organizations to progressively add services, computers, or devices to the overlay network with policy managed by the management platform. Accordingly, in some embodiments, organizations may be relieved from having to perform an abrupt switch over to the overlay network of their entire networking environment. Also, in some embodiments, one or more critical services may be provided by third-party vendors that may not support being directly included in the overlay network. In this example, for some embodiments, service computer 1022 represents an endpoint that an organization may be unable or unwilling to protect using the overlay network. Accordingly, in some embodiments, management platforms may be arranged to provide particular policies that facilitate one or more gateways in the overlay network to facilitate communication with one or more unprotected endpoints (e.g., computers not in the overlay network).

Accordingly, in some embodiments, management platforms may be arranged to facilitate communication outside of the overlay network if particular applications on a node computer may require access to unprotected endpoints that may be in the local underlay network or outside in the greater internet or other WANs.

Figure 11:
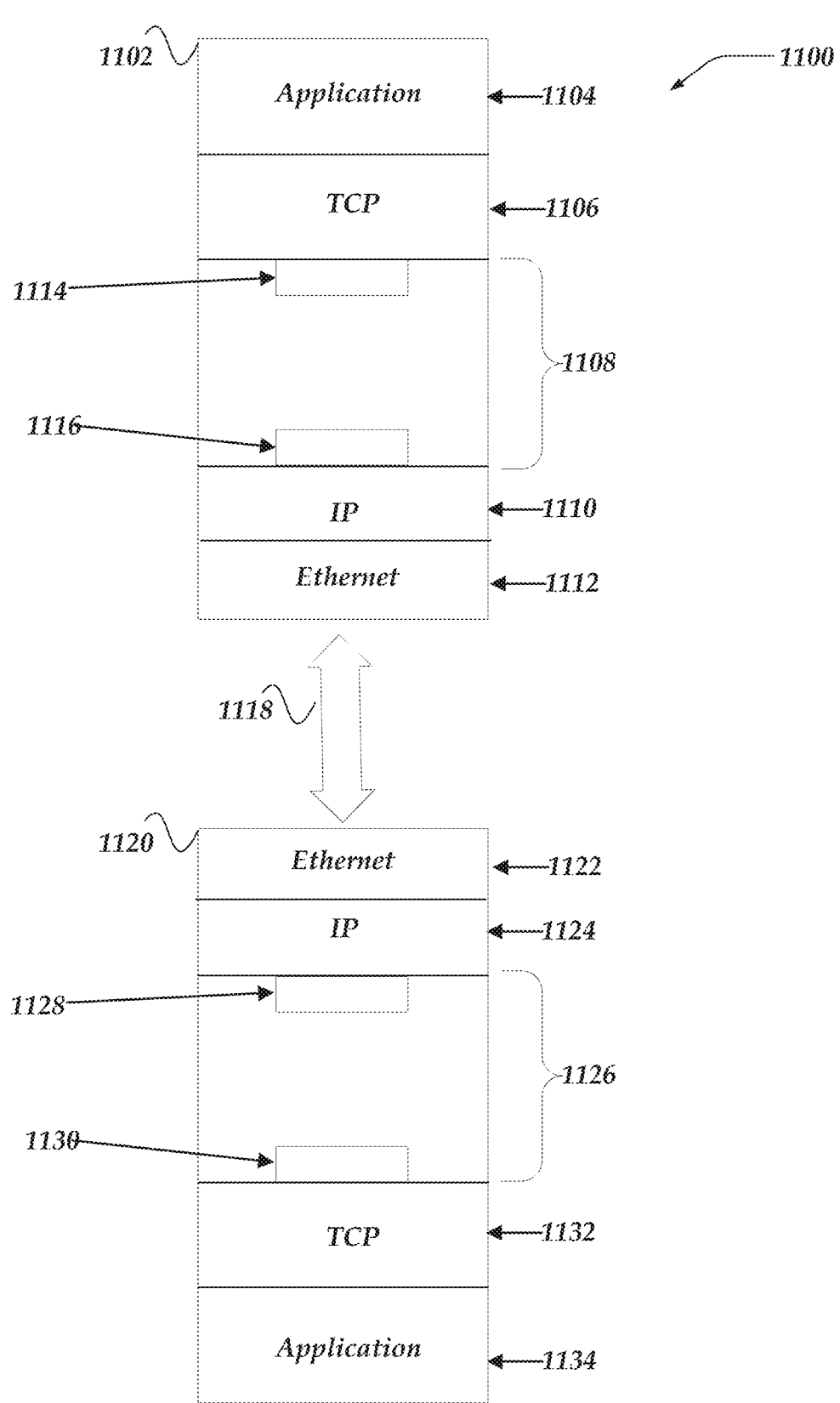
FIG. 11 illustrates a logical representation of a system for communicating in a network in accordance with at least one of the various embodiments.

FIG. 11 illustrates a logical representation of system 1100 for communicating in a network in accordance with at least one of the various embodiments. In at least one of the various embodiments, communications that are processed on a gateway computer may comprise various logical layers that may comprise a functional network communication stack. In at least one of the various embodiments, a communication on one gateway computer, such as, communication 1102 may be arranged such that an application layer, such as, application layer 1104 may perform actions that include communication; next at layer 1106, one or more standard network protocols APIs (TCP in this example) may be employed; at layer 1108 one or more special actions may be performed to support the overlay networks. And, before the communication is sent out, the lower level layers, such as, layer 1110 (IP layer in this example) or layer 1112 (Ethernet later in this example) may be applied.

In at least one of the various embodiments, gateway computers may be arranged to substitute their GID for use as a network address by higher layers such as application layer 1104 and TCP layer 1106. The GID may be arranged to be compatible with the native data structures that may be used to represent actual network addresses. Accordingly, in at least one of the various embodiments, application level networking API's that accept network address data structures as parameters may be facilitated to accept GID instead. For example, in some embodiments, an internet address may be represented using a 32-bit value. Thus, in such embodiments, the GID may be a 32-bit number, making it size compatible with an ordinary network address value of an underlay network.

In at least one of the various embodiments, at the gateway layer, layer 1108 in FIG. 11, the GID of the source gateway or the target gateway are mapped to an actual network address. In at least one of the various embodiments, component 1114 may represent components that are arranged to map GIDs to network addresses, and component 1116 may represent components that are arranged to map from a network address to a GID.

In at least one of the various embodiments, since the GIDs may be mapped to actual network addresses, network layers, such as IP layer 1110 or Ethernet layer 1112 may generate the appropriate network protocol information for the communication. Accordingly, in at least one of the various embodiments, network path 1118 may be employed to communicate the communication network packets to its next destination.

In at least one of the various embodiments, communication 1120 represents the received version of communication 1102. The network protocol layers (Ethernet layer 1122 or IP layer 1122) may accept the communication over the network; gateway layer 1126 employs component 1128 and component 1130 to map network addresses to GIDs; TCP layer 1132 performs higher level network protocol actions using the GID in place of the network address; and application layer 1134 employs the payload of the communication to perform application specific actions based on the actual contents of the payload.

In one or more of the various embodiments, network layers, such as, IP layer 1110, Ethernet layer 1112, Ethernet layer 1122, or IP layer 1124 may be associated with one or more network ports or one or more network links, hereinafter referred to as network ports or ports. In some embodiments, if there may be more than one port, gateway computers may be arranged to bridge one or more of the ports such that the bridged ports may be associated with the same network address information. Accordingly, in some embodiments, individual bridged ports may be associated with the same overlay policy because devices interacting with the bridged port may treat them as if they are same physical port even though there are more than physical connection (or more than one radio transceiver). Similarly, in some embodiments, if gateway computers have two or more ports, they may be grouped into two or more port groups that may include one or more ports each.

Alternatively, in one or more of the various embodiments, one or more ports of a gateway computer with multiple ports may be individually assigned overlay policy or otherwise considered independently from each other. Accordingly, in some embodiments, gateway engines may be arranged to distinguish individual ports or port groups on gateway computers from each other as described in more detail below.

Generalized Operations

FIGS. 12-16 represent the generalized operations for policy builders for overlay networks in accordance with at least one of the various embodiments. In at least one of the various embodiments, processes 1200, 1300, 1400, 1500, or 1600 described in conjunction with FIGS. 12-16 may be implemented by or executed on one or more processors of a relay computer, a gateway computer, or a management platform computer, such as network computer 1900 of FIG. 19. In other embodiments, these processes, or portions thereof, may be implemented by or executed on one or more processors of a plurality of network computers, such as network computer 1900 of FIG. 19. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 12-16 may be used for policy builders for overlay networks with at least one of the various embodiments or architectures such as those described in conjunction with FIGS. 1-11. Further, in at least one of the various embodiments, some or all of the actions performed by processes 1200, 1300, 1400, 1500, or 1600 may be executed in part by policy engine 1922, management platform engine 1924, monitoring engine 1926, gateway engine 1927, or the like, or combination thereof.

Figure 12:
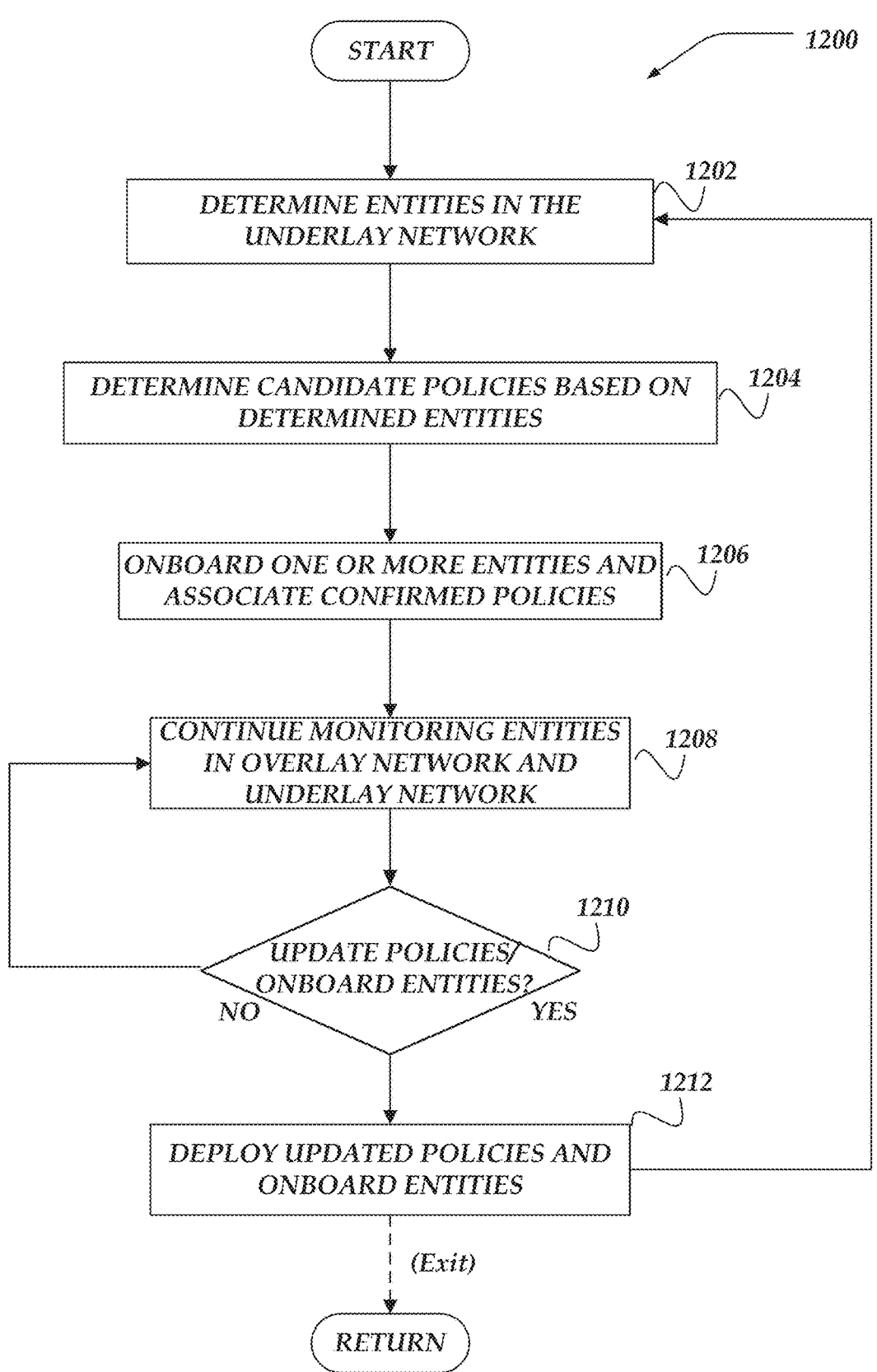
FIG. 12 illustrates an overview flowchart of a process for policy builders for overlay networks in accordance with one or more of the various embodiments.

FIG. 12 illustrates an overview flowchart of process 1200 for policy builders for overlay networks in accordance with one or more of the various embodiments. After a start block, at block 1202, in one or more of the various embodiments, management platforms may be arranged to determine one or more entities that may be in the underlay network. In one or more of the various embodiments, monitoring engines may be arranged to monitor network traffic or other activity that may occur in an underlay network. Also, in some embodiments, monitoring engines may be arranged to ingest network information from a variety of internal or external sources. For example, in some embodiments, monitoring engines may be arranged to ingest information about underlay networks or associated entities from various information sources, such as, purpose-built databases (e.g., information technology configuration databases), custom databases, spreadsheets, CSV files, XML files, or the like. Also, in some embodiments, monitoring engines may be arranged to integrate with one or more commercial network monitoring systems, firewalls, application data controllers, or the like. Also, in some embodiments, monitoring engines may be arranged to integrate with configuration management services provided by one or more cloud-computing environments.

Accordingly, in some embodiments, monitoring engines may be arranged to provide the collected information to management platforms or associated policy engines. In some embodiments, policy engines may be arranged to process the provided network information to determine or classify one or more entities in the underlay network.

At block 1204, in one or more of the various embodiments, management platforms or policy engines may be arranged to determine one or more candidate policies for the overlay network based on the determined entities. In some embodiments, policy engines may be arranged to determine one or more candidate network security policies based on the provided network information. In some embodiments, management platforms or policy engines may be arranged to provide one or more user interfaces that may generate or display one or more interactive visualizations that may represent how candidate policies may be applied. Accordingly, in some embodiments, users may be facilitated to examine various characteristics of the candidate policies including reviewing the impacted entities or other impacted network resources.

In some embodiments, policy engines may be arranged to provide one or more user interfaces that facilitate users to confirm, ignore, or reject some or all of the candidate policies. Also, in some embodiments, policy engines may be configured to automatically confirm one or more candidate policies depending on one or more rules or conditions. Also, in some embodiments, policy engines may be arranged to facilitate one or more candidate policies to be provisionally accepted. Accordingly, in some embodiments, policy engines may be arranged to automatically provisionally accept one or more candidate policies. Thus, in some embodiments, policy engines may be arranged to notify one or more users to later confirm the provisionally accepted candidate policies.

At block 1206, in one or more of the various embodiments, management platforms may be arranged to onboard one or more entities and associate one or more confirmed overlay network policies with entities in the network. In some embodiments, confirmed policies may include one or more policies confirmed by users, one or more automatically confirmed policies, or one or more provisionally confirmed policies.

In some embodiments, onboarding entities may include executing one or more actions that activate or facilitate entities within the overlay network. In some embodiments, this may include registering entities with management platform engines. Also, in some embodiments, the one or more registered entities may be associated with one or more confirmed policies that declare how the onboarded entities may interact with the overlay network or other entities in the overlay network.

Note, in some cases, one or more entities may be registered with the overlay network absent an association with policies that facilitate it access other entities in the overlay network. Thus, in some embodiments, an entity may be considered to be included in the overlay network even though it may be restricted from interacting with other entities in the same overlay network.

At block 1208, in one or more of the various embodiments, management platforms may be arranged to continue monitoring traffic associated with entities in the overlay network or underlay networks. Accordingly, in some embodiments, monitoring engines may be arranged to continuously collect network information or one or more metrics associated with network traffic in the underlay network or the overlay network. In some embodiments, monitoring engines may be arranged to provide additional information management platforms as it may be collected.

At decision block 1210, in one or more of the various embodiments, if one or more policies may require updating or one or more entities may be onboarded to the overlay networks, control may flow to block 1212; otherwise, control may loop back to block 1208.

In one or more of the various embodiments, policy engines may be arranged to continuously evaluate the updated network traffic, activity information, performance metrics, or the like, to determine if different policies may be recommended. Also, in some embodiments, policy engines may be arranged to evaluate the information or metrics to determine if existing policies may be recommended for updating. Likewise, in some embodiments, policy engines may be arranged to identify one or more entities that may appear to be associated with inappropriate policies, or the like.

At block 1212, in one or more of the various embodiments, management platforms may be arranged to deploy one or more updated policies or onboard one or more entities. Similar to deploying polices or onboarding entities for a new overlay network, management platforms may be arranged to push out updated policies, onboard different/additional entities, remove one or more entities from the overlay network, or the like.

Note, process 1200 may be terminated based on administrator input or other configuration information. In one or more of the various embodiments, generally, process 1200 may be considered to run continuously unless it is expressly suspended, disabled, or terminated. For example, in most cases, process 1200 may run continuously until an administrator explicitly suspends its operation to conduct maintenance, hardware upgrades, or the like.

Figure 13:
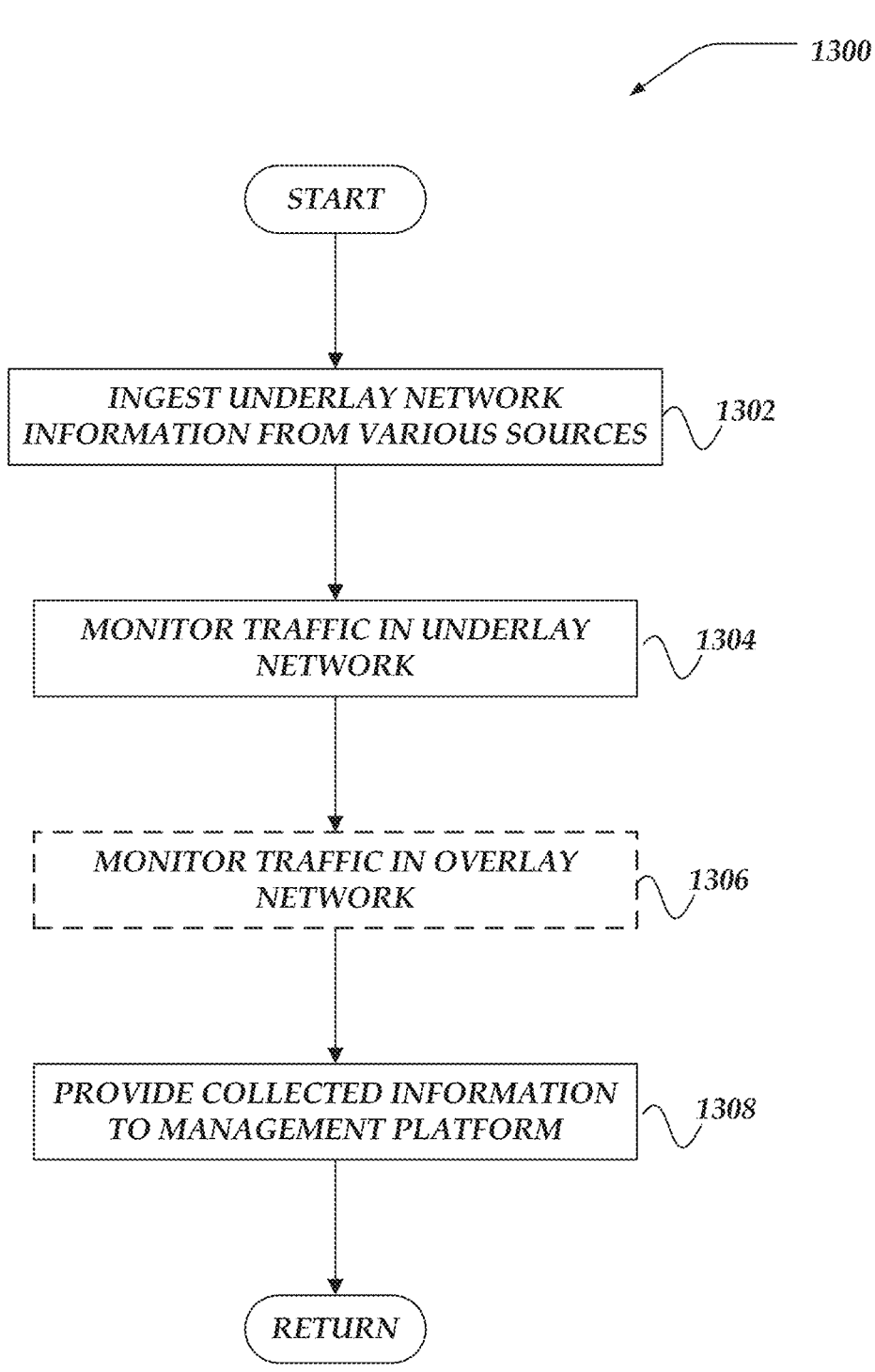
FIG. 13 illustrates a flowchart of a process for policy builders for overlay networks in accordance with one or more of the various embodiments.

FIG. 13 illustrates a flowchart of process 1300 for policy builders for overlay networks in accordance with one or more of the various embodiments. After a start block, at block 1302, in one or more of the various embodiments, monitoring agents may be arranged to ingest information associated with the underlay network or various entities in the underlay network. As mentioned above, in some embodiments, monitoring engines may be arranged to collect information or metrics from various data sources. In some embodiments, such data sources may include various conventional databases, configuration databases, or the like, Also, in some embodiments, monitoring engines may be arranged to collect information from spreadsheets, log files, event histories, or the like. Further, in some embodiments, monitoring engines may be arranged to integrate with one or more internal or external (e.g., third-party) services that may provide information about the underlay network or the various entities in the underlay network. For example, in some embodiments, monitoring engines may be arranged to integrate with one or more commercial network monitoring services, firewalls, application data controllers, or the like. Also, in some embodiments, monitoring engines may be arranged to integrate locally or remotely with one or more services provided by cloud-computing environments to collect information about cloud-based networks or entities.

Accordingly, in some embodiments, monitoring engines may be arranged to employ one or more plug-ins, libraries, extensions, rules, instructions, or the like, that may be directed to one or more particular data sources. In some embodiments, monitoring engines may be adapted to support one or more different sources as they may be encountered. Thus, in some embodiments, monitoring engines may be arranged to determine the particular plug-ins, libraries, extensions, rules, instructions, or the like, for ingesting network information based on configuration information to account for local requirements or local circumstances.

At block 1304, in one or more of the various embodiments, monitoring agents may be arranged to monitor network traffic in the underlay network. In some embodiments, monitoring engines may be arranged to passively monitor network traffic in the underlay network. In some embodiments, monitoring agents or monitoring engines may be arranged to monitor network traffic may be correlated with various entities or activities.

In one or more of the various embodiments, monitoring engines may be arranged to capture network packets (e.g., PCAP). In some embodiments, monitoring engines may be configured to sample network packets from the monitored networks. In some embodiments, monitoring engines may be configured to employ various monitoring parameters, such as, sample rates, sample/capture lengths, snapshot size, or the like, based on the particular tools, APIs, or mechanisms employed to collecting the information. Similarly, in some embodiments, monitoring engines may be configured to collect header information or metrics for various communication protocols rather than capturing raw packet payloads.

In some embodiments, monitoring engines may be arranged to integrate with one or more network monitoring services or devices. Accordingly, in some embodiments, monitoring engines may be arranged to collect traffic information, packets, packet headers, or the like, from one or more dedicated network monitoring systems.

At block 1306, in one or more of the various embodiments, optionally, monitoring agents may be arranged to monitor network traffic in the overlay network.

Similar to monitoring underlay network traffic or activity, monitoring engines may be arranged to monitor traffic or activity in overlay network or portions or overlay networks. In some embodiments, one or more portions of the information associated with monitoring overlay networks may be provided from the management platform or management platform engines directly.

Note, this block may be considered optional because in some cases, initially there may not be an overlay network.

At block 1308, in one or more of the various embodiments, monitoring agents may be arranged to provide the collected information to the management platform service.

In one or more of the various embodiments, monitoring engines may be arranged to generate records that conform to specified schema. Accordingly, in some embodiments, monitoring engines may be arranged to generate conforming records from the various sources of network information or activity information. Similar to how monitoring engines may be adaptable to various network information data sources, monitoring engines may be arranged to employ one or more plug-ins, libraries, extensions, rules, instructions, or the like, that may be directed to conforming data from one or more particular data sources. Thus, in some embodiments, monitoring engines may be arranged to determine the particular plug-ins, libraries, extensions, rules, instructions, or the like, for conforming the collected network information based on configuration information to account for local requirements or local circumstances.

In one or more of the various embodiments, conformed network information records may include identifiers that represent individual entities. Accordingly, in some embodiments, raw (non-conformed) network information corresponding to a given entity may be associated with corresponding conforming records. Thus, in some embodiments, management platform engines may be arranged to facilitate users to review the underlying (raw) network information that conformed records may be derived from.

Next, in one or more of the various embodiments, control may be returned to a calling process.

Figure 14:
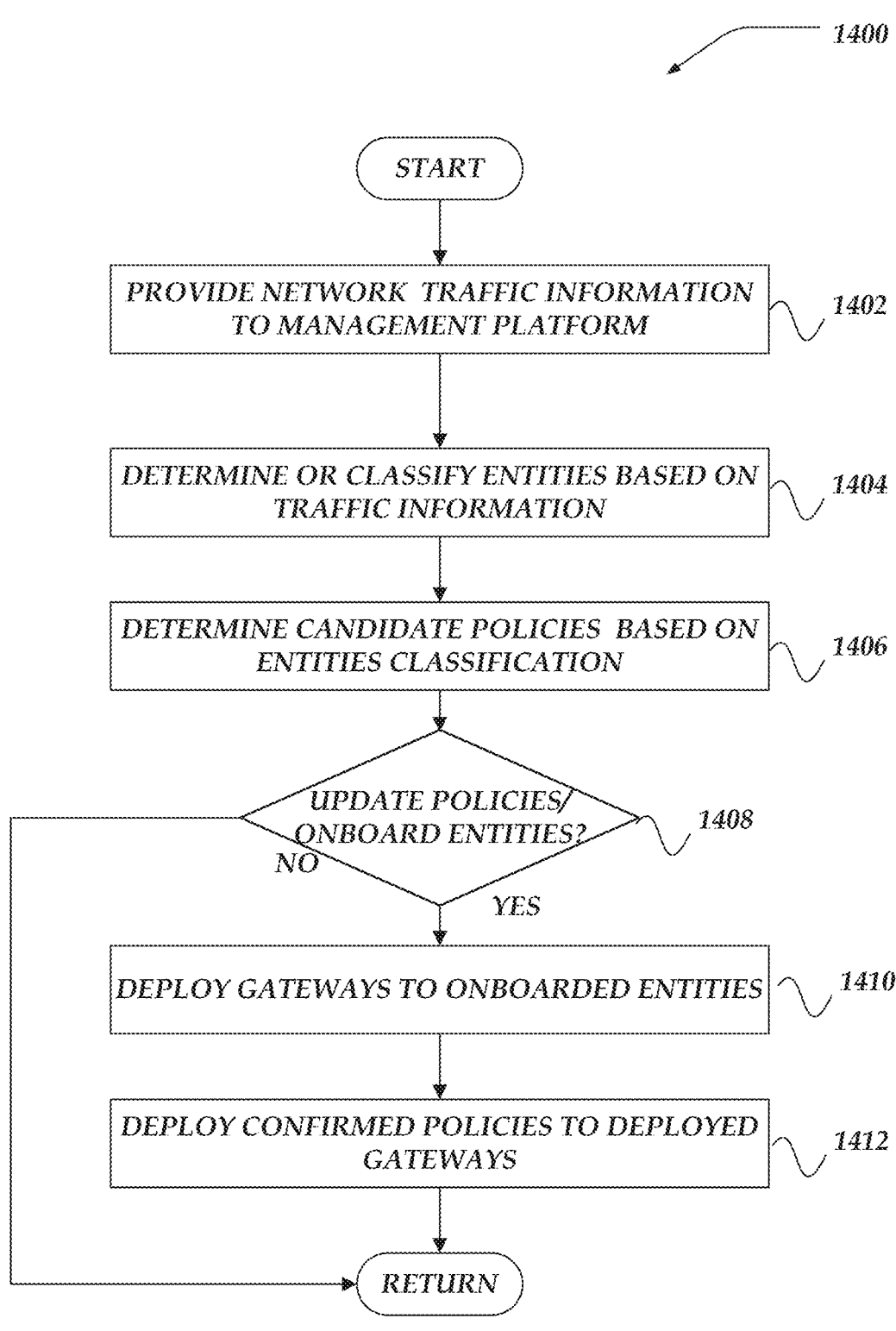
FIG. 14 illustrates a flowchart of a process for policy builders for overlay networks in accordance with one or more of the various embodiments.

FIG. 14 illustrates a flowchart of process 1400 for policy builders for overlay networks in accordance with one or more of the various embodiments. After a start block, at block 1402, in one or more of the various embodiments, monitoring agents may be arranged to provide information associated with the network traffic to the management platform. As described above, in some embodiments, monitoring engines, or the like, may be arranged to provide network information formatted into one or more records that conform to a prescribed schema.

In one or more of the various embodiments, conformed records may include information that may be employed to infer relationships or dependencies between or among entities. For example, in some embodiments, conformed records may include fields for source entity, source network address, target entity, target network address, communication protocol, application protocol, security level (e.g., encryption type, or the like), error messages, or the like.

In one or more of the various embodiments, policy engines may be arranged to determine one or more additional records based on aggregating one or more fields in the records associated with individual entities, individual sessions, or the like. Also, in one or more of the various embodiments, conformed records provided by monitoring engines may include one or more aggregate metrics such as transaction/session count, data transfer amount, average data transmission rates, or the like.

Also, in some embodiments, monitoring engines may be arranged to provide the underlying raw data that may have been employed to generate the conformed records. In some cases, for some embodiments, monitoring engines may provide a reference identifier, or the like, that may be employed to obtain raw data from other data sources. Also, in some embodiments, the raw information corresponding to each conformed record may be embedded or included in the provided conformed record.

At block 1404, in one or more of the various embodiments, management platforms may be arranged to determine or classify one or more entities based on the provided traffic information. In some embodiments, policy engines may be arranged to infer or discover one or more entities from the conformed records. In some embodiments, policy engines may be arranged to employ one or more machine-learning classifiers, heuristics, rules, or instructions to classify entities. For example, one or more machine-learning classifiers may be trained to predict entity types based on one or more conformed records. Likewise, in some embodiments, heuristics that evaluate various shared or related characteristics of entities or network traffic may be employed to identify individual entities or groups of entities.

In some embodiments, policy engines may be arranged to classify entities based on the type of application protocols that may be used during its communications. Also, in some embodiments, policy engines may be arranged to the 'direction' of request/response transactions may be evaluated to determine if entities may be considered servers or clients. In some embodiments, other considerations, including, security/encryption protocols, network communication protocols, session length, number of simultaneous connections, network address information, hardware/device characteristics, application type, operating system, utilization, resource/bandwidth consumption, or the like, may be employed for classifying entities in the underlay network or overlay network.

In some embodiments, policy engines may be arranged to classify entities as precisely as possible. However, in some cases, for some embodiments, classification may be limited to general classes, such as, server, client, or the like, depending on the available information provided by the monitoring engine.

Also, in some embodiments, policy engines may be arranged to progressively refine the classification of entities based on additional/updated information provided by monitoring engines or user input. For example, in some embodiments, a policy engine may initially classify an entity as a 'web server' that may be later reclassified as a particular web server application that includes brand name, version, patch level, or the like, based on later collected information or user inputs.

In one or more of the various embodiments, policy engines may be arranged to include scores that may indicate a level confidence in the predicted classification. For example, in some embodiments, policy engines may confidently predict that an entity is a streaming video server while not being as certain about the particular brand or version of the software providing the video server. Note, in some embodiments, policy engines may be arranged to continually update the confidence scores as monitoring engines continue to provide related information. Likewise, in some embodiments, policy engines may be arranged to facilitate users to confirm or reject classifications such that a particular feature predicted or inferred by classification (e.g., application brand) may be confirmed or rejected by administrators.

At block 1406, in one or more of the various embodiments, management platforms may be arranged to determine one or more candidate policies based on the classification of the entities. In some embodiments, policy engines may be arranged to evaluate the classified entities or their associated network information (e.g., conformed records, metrics, network traffic, or the like) to determine one or more candidate policies.

In one or more of the various embodiments, policy engines may be arranged to infer groupings of entities that may be associated with policies. For example, in some embodiments, policy engines may generate a policy that facilitates server X to communicate with one or more other entities that were discovered to regularly communicate with server X. Accordingly, for this example, clients may be grouped into a group of 'clients of server X' and a policy may grant 'clients of server X' access to 'server X' (in the overlay network).

In one or more of the various embodiments, management platforms may be arranged to generate policies that restrict entities from communicating in overlay network unless a policy expressly grants permission. Accordingly, in some embodiments, unless a policy grants permission for entities to communicate with each other they may be restricted from communicating via the overlay network.

Accordingly, in some embodiments, policy engines may be arranged to determine which entities in the underlay network actually communicate with each other. In some embodiments, this determination may be employed to generate one or more candidate policies that explicitly facilitate the observed communications to occur in the overlay network.

Also, in some embodiments, policy engines may be arranged to identify one or more communications to entities or services that may be outside of the underlay network. For example, an organization may employ one or more external services such as email services, business support services, various SaaS offerings, update servers, license servers, or the like. Accordingly, in some embodiments, policy engines may be arranged to identity such services and provide candidate policies that facilitate entities dependent on the outside-services to reach them outside of the overlay network.

Likewise, in some embodiments, policy engines may be arranged to determine if one or more restricted services have been accessed. For example, in some embodiments, an organization may identify a collection of outside services that entities in the overlay network may be restricted from accessing. Accordingly, in some embodiments, policy engines may be configured to automatically restrict access to such external services or associated network endpoints even though they were accessed from entities in the underlay network.

In some embodiments, policy engines may be arranged to employ various services, including reverse DNS lookup, published catalogs/indexes of risky endpoints, user supplied lists (e.g., network addresses, host names, application names, or the like), or the like, to identify restricted external services or network endpoints.

In one or more of the various embodiments, management platforms may be arranged to facilitate policies to be assigned to groups that may include one or more entities. In some embodiments, policy engines may be arranged to recommend groups based on group member similarities. Accordingly, in some embodiments, policy engines may be arranged to propose one or more groupings of entities based on one or more shared characteristics of the entities. Also, in some embodiments, policy engines may be arranged to compare network activity of entities for determining grouping recommendations. For example, in some embodiments, clients discovered to regularly access a particular database server may be associated in a group labeled "database clients," or the like. Also, for example, in some embodiments, entities may be grouped based on location, operating system, hardware, cloud-environment vendor, hosted applications, type of device or machine, owner, or the like. In some embodiments, policy engines may be arranged to consider the number of entities though would be in a group. For example, in some embodiments, if there are many entities accessing the database server, they may be subdivided based on other characteristics. Further, in some embodiments, policy engines may be arranged to provide user interfaces that facilitate users to selectively assign entities to group. Accordingly, in some embodiments, policy engines may facilitate users to arbitrarily associate one or more entities with one or more groups. In some embodiments, users may be facilitated to create one or more groups that reflect the departments, roles, responsibilities, or the like, in their organization. For example, in some embodiments, a user may create one group for desktop computers associated with their marketing departments and another group for desktop computers associated with their accounting departments. Note, in some embodiments, policy engines may be arranged to automatically predict or infer a group of computers associated with different internal organizations, such as, marketing departments, engineering departments, human resources, executive teams, or the like, based on the monitored network information. For example, in some embodiments, computers that regularly access source control repositories or other engineering resources may be associated with a same group even though the group is not explicitly declared to be an engineering group.

Further, in some embodiments, policy engines may be arranged to identify one or more entities that may be new to the management platform. For example, in some embodiments, if additional devices have been added to an underlay network, policy engines may be arranged to recommend policies, groupings, or the like, for the additional entities.

Also, in some embodiments, policy engines may be arranged to determine one or more stale entities that may have been previously associated with policies in the overlay network. In some embodiments, stale entities may include entities that have not been observed operating in the overlay network. Accordingly, in some embodiments, policy engines may be arranged to monitor how long it has been since entities generated network traffic or other activity. Also, in some embodiments, policy engines may be arranged to actively probe one or more entities with system/network ping commands or other watchdog/heartbeat services. In some embodiments, policy engines may be configured to determine entities may be stale if they remain inactive or non-responsive beyond a threshold duration. Further, in some embodiments, policy engines may be arranged to execute particular actions to determine staleness for particular entity types, group types, specified groups of entities, or the like. In some embodiments, policy engines may be adapted to support additional entities that may comprise various applications, devices, network protocols, or the like. Accordingly, in some embodiments, policy engines may be arranged to employ rules, instructions, classifiers, libraries, extensions, or the like, provided via configuration information for determining staleness to account for local requirements or local circumstances.

In one or more of the various embodiments, policy engines may be arranged to generate one or more user interfaces that facilitate users to confirm, modify, or reject policy or grouping recommendations. In some embodiments, user modifications may include adding or removing entities from candidate policies, modifying groups, modifying group membership criteria, or the like.

At decision block 1408, in one or more of the various embodiments, if one or more policies may be updated or one or more entities may be onboarded to the overlay network, control may flow to block 1410; otherwise, control may be returned to a calling process. In some embodiments, if there may be confirmed profiles or confirmed updates to one or more profiles, management platforms may be arranged to propagate the new profiles or new updates to the associated gateway computers to enforce the changes.

At block 1410, in one or more of the various embodiments, management platforms may be arranged to deploy one or more confirmed policies to the one or more deployed gateways in the overlay network. As described above, in some embodiments, gateway computers may be configured by management platforms to enforce network policies in the overlay network. In some cases, in some embodiments, an entity may not be associated with a gateway computer or gateway agent. Accordingly, in some embodiments, management platforms may be arranged to associate the relevant entities with a gateway computer or gateway agent. In some cases, gateway agents may be installed on demand. For example, in some embodiments, management platforms may be integrated with one or more application deployment systems that may automatically install gateway agents on one or more entities. Also, in some embodiments, management platforms may be arranged to facilitate users to install gateway agents. For example, in some embodiments, management platforms may be arranged to provide link via email or displayed on an application that facilitates users to install gateway agents. Further, in some embodiments, gateway agents may be pre-installed on entities before they are deployed in the underlay network such that they may be available if the entities may be later added to the overlay network.

At block 1412, in one or more of the various embodiments, management platforms may be arranged to deploy the one or more confirmed policies or policy updates to the one or more deployed gateway computers.

In one or more of the various embodiments, management platforms or gateway agent may be arranged to be aware of each other. For example, in some embodiments, gateway agent or gateway computer may be arranged to automatically communicate with their associated management platforms. Accordingly, in some embodiments, management platforms may be arranged to track various metrics or statuses associated with gateways. Thus, in some embodiments, management platforms may track the identity of the gateways and the entities it may be protecting.

In one or more of the various embodiments, if gateway computers may be separate from the protected entities, management platforms may be arranged to automatically configure those gateway computers to employ the new or updated profiles. For example, in some embodiments, if a gateway computer may manage/protect one or more devices, policies associated with those devices may be automatically delivered or installed to the gateway computer by the management platform.

Accordingly, in some embodiments, management platforms may be arranged to push out the new or updated policies to the gateways to enforce the new or updated policies in the overlay network.

Next, in one or more of the various embodiments, control may be returned to a calling process.

Figure 15:
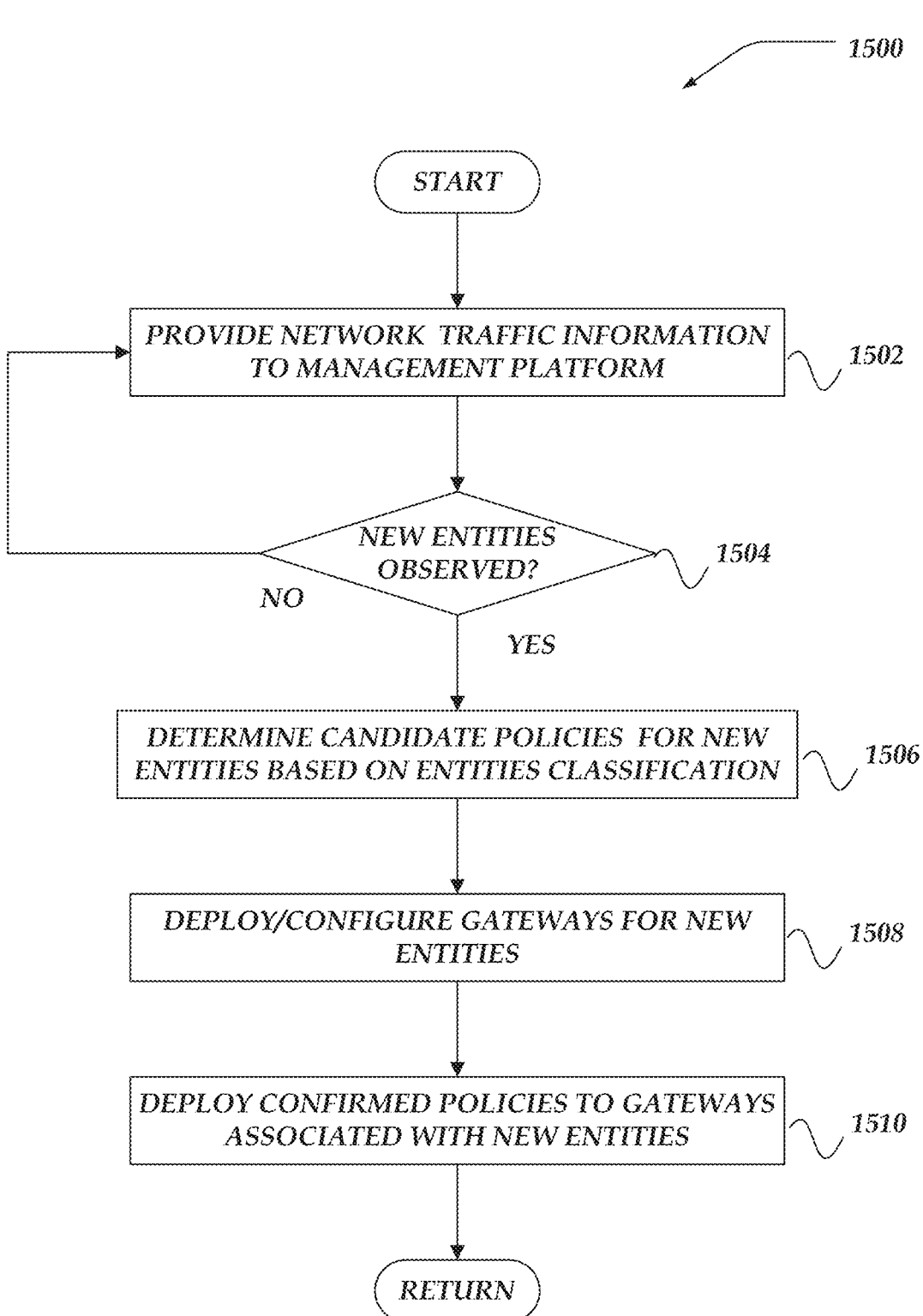
FIG. 15 illustrates a flowchart of a process for policy builders for overlay networks in accordance with one or more of the various embodiments.

FIG. 15 illustrates a flowchart of process 1500 for policy builders for overlay networks in accordance with one or more of the various embodiments. After a start block, at block 1502, in one or more of the various embodiments, policy engines may be arranged to evaluate information that may be provided based on monitoring activity in the networks.

At block 1504, in one or more of the various embodiments, if one or more new entities may be determined, control may flow to block 1506; otherwise, control may loop back to block 1502.

In one or more of the various embodiments, monitoring engines or policy engines may be arranged to identify network traffic or other activity that may be associated with one or more entities that may be unknown to the management platform. In some embodiments, "different entities" may include the identification of applications, services, communication protocols, physical or virtual computers, mobile computers, or the like, that are not known to management platforms or otherwise covered by one or more policies.

In some embodiments, management platforms (policy engines or monitoring engines) may be arranged to identify new entities based on network identifiers (e.g., MAC addresses, IP addresses, or the like) associated with the new entities. Also, in some embodiments, new applications or services may be identified based on network traffic that conforms to one or more application protocols that may be associated with the new applications or services.

In some embodiments, applications or services may be considered to be new if management platforms determines that they may be hosted on known computers that previously were unassociated with those applications or services. For example, if a user installs a new web server on their desktop computer, management platforms may observe the web server traffic or other traffic characteristics that indicate a new application is active. Note, in this example, if the desktop computer is associated with a policy that rejects HTTP requests from outside clients, clients attempting to reach this example web server may be blocked by the overlay network. Similarly, in some embodiments, if the desktop computer in this example is facilitated to access the underlay network, the new web server may be able exchange web server traffic to other endpoints via the underlay network. Accordingly, in this example, for some embodiments, detecting unexpected web server traffic in the underlay network (rather than in the overlay network) may be considered to be a discovery of a new entity.

Note, in some embodiments, in some cases, it may be expected to see regular or occasional new entities. For example, in some embodiments, in its normal course of business an organization may add authorized entities (e.g., new computers, new applications, or the like). Also, in some embodiments, new entities may be progressively detected during a managed deployment of the overlay network. For example, in some cases, one or more entities may be initially excluded from the overlay network deployment based on entity type, network address range, network protocol, geographic location, or the like. Thus, in some embodiments, as one or more arbitrary conditions are met, one or more of the excluded entities may become eligible for inclusion in the overlay network.

Also, in some embodiments, in some cases, one or more previously known entities (e.g., entities associated with an overlay network policy) may be removed from the overlay network such that they may re-appear as a new entity if they become associated with network traffic or other network activity.

Further, in some embodiments, management platforms may be arranged to employ one or more heuristics, classifiers, or the like, that may be configured to account for local requirements or local circumstances. Accordingly, in some embodiments, management platforms may be arranged to determine how to determine if new entities are observed based on configuration information.

At block 1506, in one or more of the various embodiments, management platforms may be arranged to determine one or more candidate policies based on the new entities. As described above, policy engines may be arranged to determine one or more candidate policies for the new entities.

At block 1508, in one or more of the various embodiments, management platforms may be arranged to deploy one or more gateways for the new entities. As described above, management platforms may be arranged to deploy one or more gateway agents or configured one or more gateway computers to facilitate the management platform to manage overlay network access for the new entities.

At block 1510, in one or more of the various embodiments, management platforms may be arranged to deploy one or more confirmed policies to the gateways (e.g., gateway agents or gateway computers) associated with the new entities.

Next, in one or more of the various embodiments, control may be returned to a calling process.

Figure 16:
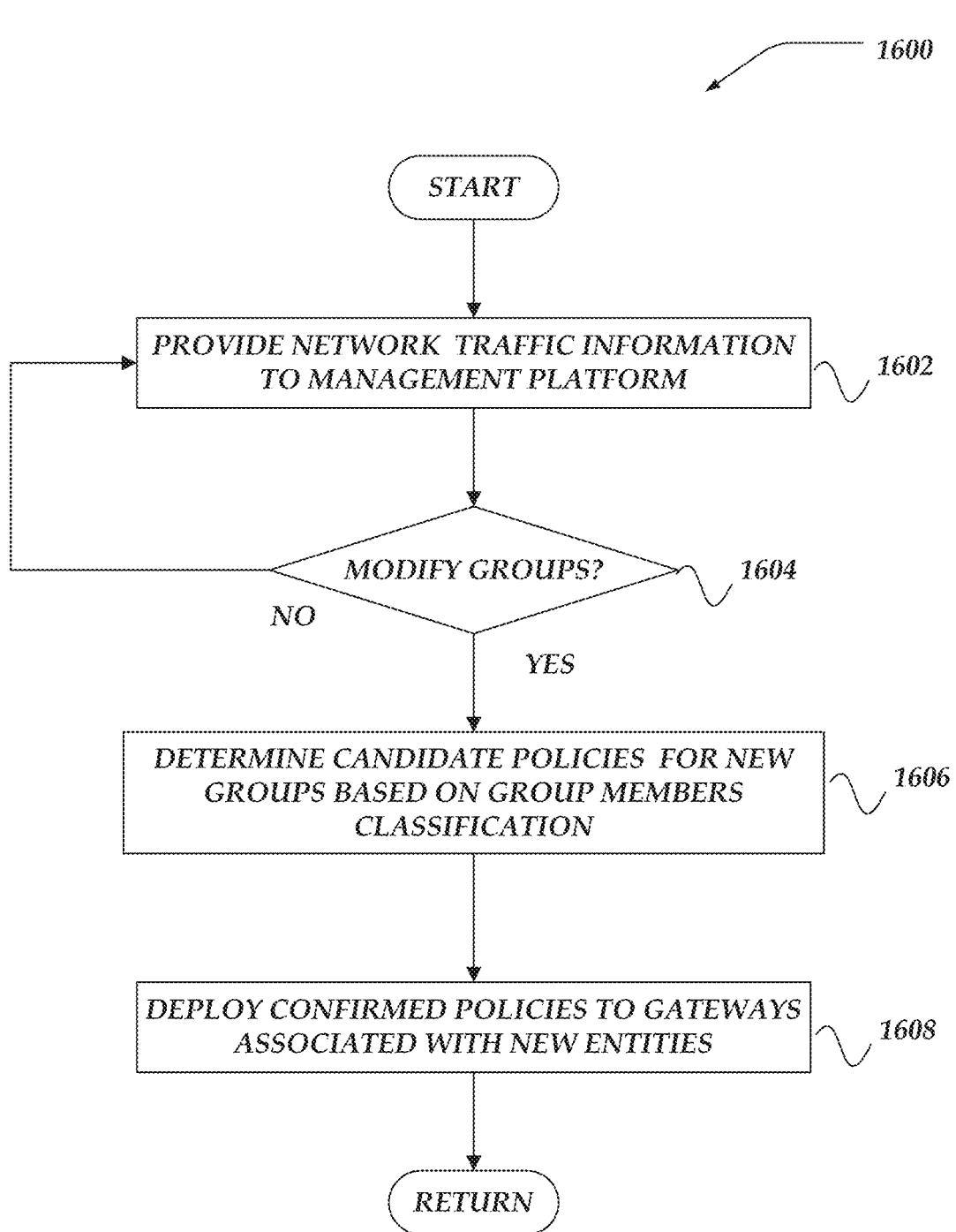
FIG. 16 illustrates a flowchart of a process for policy builders for overlay networks in accordance with one or more of the various embodiments.

FIG. 16 illustrates a flowchart of process 1600 for policy builders for overlay networks in accordance with one or more of the various embodiments. After a start block, at block 1602, in one or more of the various embodiments, policy engines may be arranged to evaluate information that may be provided based on monitoring activity in the networks.

At block 1604, in one or more of the various embodiments, if one or more groups may be modified, control may flow to block 1606; otherwise, control may loop back to block 1602.

As described above, management platforms or policy engines may be arranged to associate entities into groups that may be associated with policies. Accordingly, in some cases, policy engines may determine that one or more groups may be modified by including or excluding one or more entities. Likewise, in some embodiments, policy engines may be arranged to determine if existing entities in existing groups may be moved to other groups or into new groups.

As described above, in some embodiments, management platforms may progressively learn about the entities in the overlay network or the underlay network. Accordingly, as additional information may be collected about activity in the overlay network or underlay network, management platforms may modify or adapt groups, policies, or the like, based on some or all of the additional information. Also, in some cases, for some embodiments, users may intervene and modify group membership criteria or directly assign one or more entities to particular groups.

For example, for some embodiments, if the overlay network is initially deployed, it may define a group for Windows desktop computers in the Seattle office. However, for example, as more information is gathered from the overlay network or the underlay network, management platforms may determine that the original group may split based on the type of applications or user roles associated with difference desktop computers in the original group. Likewise, in some embodiments, management platforms may determine that two different groups of similar entities should be combined into a same group based on both groups behaving similarly or having similar policies.

In general, in some embodiments, management platforms may be arranged to recommend group modifications that may simplify the management or understanding of the overlay network and its included entities. Accordingly, in some embodiments, other criteria, such as, user roles, maintenance responsibility, security/privacy classification, or the like. Also, in some cases, users may provide information (e.g., entity labeling) that may be used to modify groups.

Further, in one or more of the various embodiments, policy engines may be arranged to evaluate if candidate policies may be recommended for groups that may be associated with one or more existing policies. For example, in some embodiments, policy engines may identify a group that includes members that exhibit behavior that may benefit from a different policy. For example, in some cases, policy engines may determine that a group includes a member entity that is observed behaving similar to entities in another group with different policies. Thus, for example, the policy engines may be arranged to recommend that the policy for the original group may be modified to match the policy of the other group.

At block 1606, in one or more of the various embodiments, management platforms may be arranged to determine one or more candidate policies for the new or modified groups based on the associated members or other criteria associated with forming entities into groups.

At block 1608, in one or more of the various embodiments, management platforms may be arranged to deploy one or more confirmed policies to gateway agents or gateway computers associated with the modified group members. As described above, management platform engines may maintain an index or catalog that associates entities with gateways. Accordingly, in some embodiments, management platform engines may be arranged to determine which gateway computer or gateway agent may be updated.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the innovations disclosed herein. Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the innovations disclosed herein.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Illustrated Operating Environment

Figure 17:
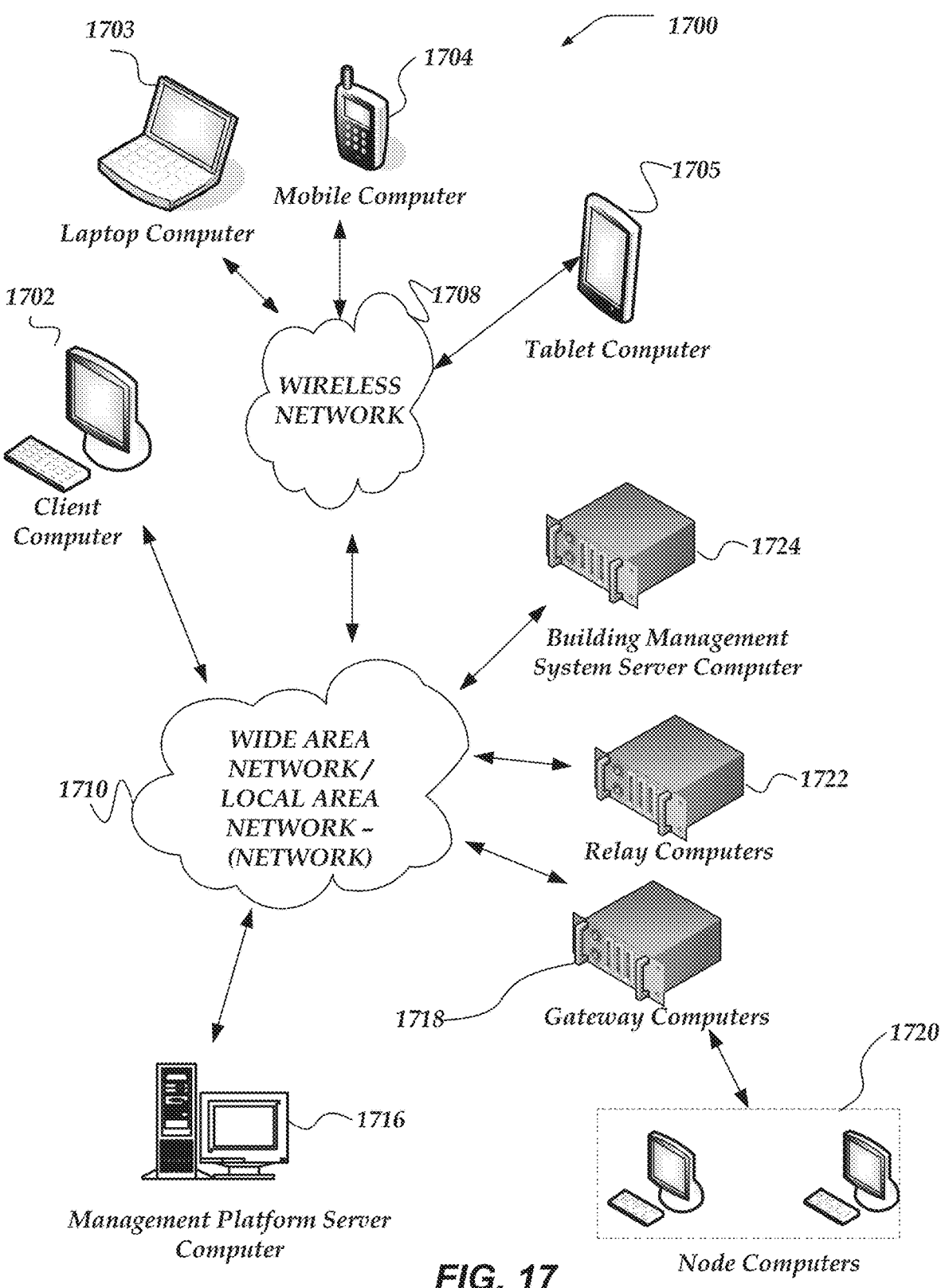
FIG. 17 illustrates a system environment in which various embodiments may be implemented.

FIG. 17 shows components of one embodiment of an environment in which embodiments of the innovations disclosed herein may be practiced. Not all of the components may be required to practice the innovations disclosed herein, and variations in the arrangement and type of the components may be made without departing from the spirit or scope of the innovations disclosed herein. As shown, system 1700 of FIG. 17 includes local area networks (LANs)/wide area networks (WANs)-(network) 1710, wireless network 1708, client computers 1702-1705, management platform server computer 1716, gateway computers 1718, node computers 1720, relay computers 1722, building management system server computer 1724, or the like.

At least one embodiment of client computers 1702-1705 is described in more detail below in conjunction with FIG. 2. In one embodiment, at least some of client computers 1702-1705 may operate over one or more wired or wireless networks, such as networks 1708, or 1710. Generally, client computers 1702-1705 may include virtually any computer capable of communicating over a network to send and receive information, perform various online activities, offline actions, or the like.

For example, client computers 1702-1705 may be configured to operate as a web server, client application, media player, mobile telephone, game console, desktop computer, or the like. It should be recognized that more or less client computers (as shown in FIG. 17) may be included within a system such as described herein, and embodiments are therefore not constrained by the number or type of client computers employed.

Computers that may operate as client computer 1702 may include computers that typically connect using a wired or wireless communications medium such as personal computers, multiprocessor systems, microprocessor-based or programmable electronic devices, network PCs, or the like. In some embodiments, client computers 1702-1705 may include virtually any portable computer capable of connecting to another computer and receiving information such as, laptop computer 1703, mobile computer 1704, tablet computers 1705, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 1702-1705 typically range widely in terms of capabilities and features. Moreover, client computers 1702-1705 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), JavaScript Object Notation (JSON), or the like, to display and send a message. In one embodiment, a user of the client computer may employ the browser application to perform various activities over a network (online). However, another application may also be used to perform various online activities.

Node computers 1722 represent one or more client computer, network computer, or network devices, or the like, that may be arranged to access networks via a gateway computer. Each node computer may be associated with a gateway computer that enable network access to other node computers, gateway computers, or the like. Node computers 1722 may be arranged to communicate with their associated gateway computer. Accordingly, in some embodiments, their gateway computer may route the node computer communication according to policy provided by a management platform server, such as, management platform server computer 1716.

Wireless network 1708 is configured to couple client computers 1703-1705 and its components with network 1710. Wireless network 1708 may include any of a variety of wireless sub-networks that may further overlay stand-alone ad-hoc networks, and the like, to provide an infrastructure-oriented connection for client computers 1703-1705. Such sub-networks may include overlay networks, Wireless LAN (WLAN) networks, cellular networks, and the like. In one embodiment, the system may include more than one wireless network.

Wireless network 1708 may further include an autonomous system of terminals, gateways, routers, and the like connected by wireless radio links, and the like. These connectors may be configured to move freely and randomly and organize themselves arbitrarily, such that the topology of wireless network 1708 may change rapidly.

Wireless network 1708 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may facilitate wide area coverage for mobile computers, such as client computers 1703-1705 with various degrees of mobility. In one non-limiting example, wireless network 1708 may facilitate a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 1708 may include virtually any wireless communication mechanism by which information may travel between client computers 1703-1705 and another computer, network, a cloud-based network, a cloud instance, or the like.

Network 1710 is configured to couple network computers with other computers, including, management platform server computer 1716, gateway computers 1718, node computers 1720, relay computers 1722, building management system server computer 1724, client computers 1702-1705 through wireless network 1708, or the like. Network 1710 is configured to employ any form of computer readable media for communicating information from one electronic device to another. Also, network 1710 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, facilitating or causing messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 1710 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Although FIG. 17 illustrates management platform server computer 1716, gateway computers 1718, node computers 1720, or relay computers 1722, or building management system server computer 1724 each as a single computer, the innovations or embodiments are not so limited. For example, one or more functions of management platform server computer 1716, gateway computers 1718, node computers 1720, building management system server computer 1724, or the like, may be distributed across one or more distinct network computers. Moreover, management platform server computer 1716, gateway computers 1718, node computers 1720, relay computers 1722, building management system server computer 1724, or the like, are not limited to a particular configuration such as the one shown in FIG. 17. Thus, in one or more embodiments, management platform server computer 1716, gateway computers 1718, node computers 1720, relay computers 1722, building management system server computer 1724, or the like, may be implemented using a plurality of network computers. In other embodiments, management platform server computer 1716, gateway computers 1718, node computers 1720, relay computers 1722, building management system server computer 1724, or the like, may operate as a plurality of network computers within a cluster architecture, a peer-to-peer architecture, or the like. Also, in some embodiments, one or more processors on one or more network computers may be arranged to perform one or more actions of management platform server computer 1716, gateway computers 1718, node computers 1720, relay computers 1722, building management system server computer 1724, or the like. Further, in at least one of the various embodiments, management platform server computer 1716, gateway computers 1718, node computers 1720, relay computers 1722, building management system server computer 1724, or the like, may be implemented using one or more cloud instances in one or more cloud computing environments. Likewise, in at least one of the various embodiments, management platform server computer 1716, gateway computers 1718, node computers 1720, relay computers 1722, building management system server computer 1724, or the like, may be implemented using one or more container instances in one or more container computers environments.

Figure 18:
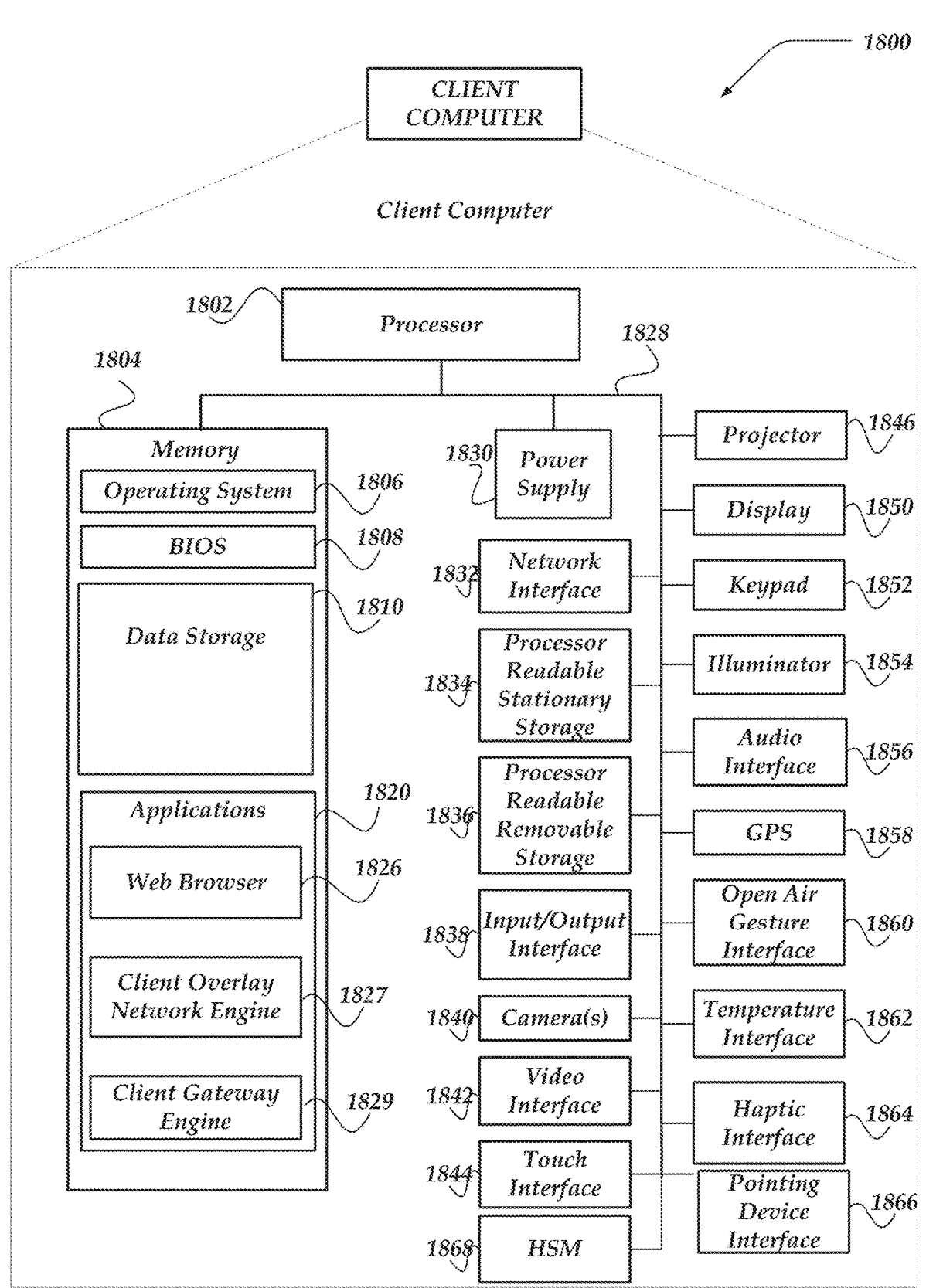
FIG. 18 illustrates a schematic embodiment of a client computer.

FIG. 18 shows one embodiment of client computer 1800 that may include many more or less components than those shown. Client computer 1800 may represent, for example, at least one embodiment of mobile computers or client computers 1702-1705 shown in FIG. 17. Also, in some embodiments, one or more node computers, such as, node computers 1720 may be client computers.

Client computer 1800 may include processor 1802 in communication with memory 1804 via bus 1828. Client computer 1800 may also include power supply 1830, network interface 1832, audio interface 1856, display 1850, keypad 1852, illuminator 1854, video interface 1842, input/output interface 1838, haptic interface 1864, global positioning systems (GPS) receiver 1858, open air gesture interface 1860, temperature interface 1862, camera(s) 1840, projector 1846, pointing device interface 1866, processor-readable stationary storage device 1834, and processor-readable removable storage device 1836. Client computer 1800 may optionally communicate with a base station (not shown), or directly with another computer. And in one embodiment, although not shown, a gyroscope may be employed within client computer 1800 to measuring or maintaining an orientation of client computer 1800.

Power supply 1830 may provide power to client computer 1800. A rechargeable or non-rechargeable battery may be used to provide power. The power may also be provided by an external power source, such as an AC adapter or a powered docking cradle that supplements or recharges the battery.

Network interface 1832 includes circuitry for coupling client computer 1800 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 1832 is sometimes known as a transceiver, transceiving device, or network interface card (NIC).

Audio interface 1856 may be arranged to produce and receive audio signals such as the sound of a human voice. For example, audio interface 1856 may be coupled to a speaker and microphone (not shown) to facilitate telecommunication with others or generate an audio acknowledgement for some action. A microphone in audio interface 1856 can also be used for input to or control of client computer 1800, e.g., using voice recognition, detecting touch based on sound, and the like.

Display 1850 may be a liquid crystal display (LCD), gas plasma, electronic ink, light emitting diode (LED), Organic LED (OLED) or any other type of light reflective or light transmissive display that can be used with a computer. Display 1850 may also include a touch interface 1844 arranged to receive input from an object such as a stylus or a digit from a human hand, and may use resistive, capacitive, surface acoustic wave (SAW), infrared, radar, or other technologies to sense touch or gestures.

Projector 1846 may be a remote handheld projector or an integrated projector that is capable of projecting an image on a remote wall or any other reflective object such as a remote screen.

Video interface 1842 may be arranged to capture video images, such as a still photo, a video segment, an infrared video, or the like. For example, video interface 1842 may be coupled to a digital video camera, a web-camera, or the like. Video interface 1842 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 1852 may comprise any input device arranged to receive input from a user. For example, keypad 1852 may include a push button numeric dial, or a keyboard. Keypad 1852 may also include command buttons that are associated with selecting and sending images.

Illuminator 1854 may provide a status indication or provide light. Illuminator 1854 may remain active for specific periods of time or in response to events. For example, when illuminator 1854 is active, it may backlight the buttons on keypad 1852 and stay on while the client computer is powered. Also, illuminator 1854 may backlight these buttons in various patterns when particular actions are performed, such as dialing another client computer. Illuminator 1854 may also cause light sources positioned within a transparent or translucent case of the client computer to illuminate in response to actions.

Further, client computer 1800 may also comprise hardware security module (HSM) 1868 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 1868 may be a standalone computer, in other cases, HSM 1868 may be arranged as a hardware card that may be added to a client computer.

Client computer 1800 may also comprise input/output interface 1838 for communicating with external peripheral devices or other computers such as other client computers and network computers. The peripheral devices may include an audio headset, display screen glasses, remote speaker system, remote speaker and microphone system, and the like. Input/output interface 1838 can utilize one or more technologies, such as Universal Serial Bus (USB), Infrared, Wi-Fi, WiMax, Bluetooth™, and the like.

Haptic interface 1864 may be arranged to provide tactile feedback to a user of the client computer. For example, the haptic interface 1864 may be employed to vibrate client computer 1800 in a particular way when another user of a computer is calling. Temperature interface 1862 may be used to provide a temperature measurement input or a temperature changing output to a user of client computer 1800. Open air gesture interface 1860 may sense physical gestures of a user of client computer 1800, for example, by using single or stereo video cameras, radar, a gyroscopic sensor inside a computer held or worn by the user, or the like. Camera 1840 may be used to track physical eye movements of a user of client computer 1800.

GPS transceiver 1858 can determine the physical coordinates of client computer 1800 on the surface of the Earth, which typically outputs a location as latitude and longitude values. GPS transceiver 1858 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 1800 on the surface of the Earth. It is understood that under different conditions, GPS transceiver 1858 can determine a physical location for client computer 1800. In at least one embodiment, however, client computer 1800 may, through other components, provide other information that may be employed to determine a physical location of the client computer, including for example, a Media Access Control (MAC) address, IP address, and the like.

Human interface components can be peripheral devices that are physically separate from client computer 1800, allowing for remote input or output to client computer 1800. For example, information routed as described here through human interface components such as display 1850 or keyboard 1852 can instead be routed through network interface 1832 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 1826 that may be configured to receive and to send web pages, web-based messages, graphics, text, multimedia, and the like. The client computer's browser application may employ virtually any programming language, including a wireless application protocol (WAP) messages, and the like. In at least one embodiment, the browser application is configured to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like. Web browser 1826 may be used to configure overlay routes via management platform server computer 1716, as discussed below in conjunction with FIG. 3. For example, a user may operate web browser application 1826 in order to configure one or more port level policies or port isolation policies for one or more node computers or gateway computers.

Memory 1804 may include RAM, ROM, or other types of memory. Memory 1804 illustrates an example of computer-readable storage media (devices) for storage of information such as computer-readable instructions, data structures, program modules or other data. Memory 1804 may store BIOS 1808 for controlling low-level operation of client computer 1800. The memory may also store operating system 1806 for controlling the operation of client computer 1800. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that facilitates control of hardware components or operating system operations via Java application programs.

Memory 1804 may further include one or more data storage 1810, which can be utilized by client computer 1800 to store, among other things, applications 1820 or other data.

For example, data storage 1810 may also be employed to store information that describes various capabilities of client computer 1800. The information may then be provided to another device or computer based on any of a variety of events, including being sent as part of a header during a communication, sent upon request, or the like. Data storage 1810 may also be employed to store social networking information including address books, buddy lists, aliases, user profile information, or the like. Data storage 1810 may further include program code, data, algorithms, and the like, for use by a processor, such as processor 1802 to execute and perform actions. In one embodiment, at least some of data storage 1810 might also be stored on another component of client computer 1800, including, but not limited to, non-transitory processor-readable removable storage device 1836, processor-readable stationary storage device 1834, or even external to the client computer.

Applications 1820 may include computer executable instructions which, when executed by client computer 1800, transmit, receive, or otherwise process instructions and data. Applications 1820 may include, for example, web browser 1826, client overlay engine 1827, client gateway engine 1829, or the like. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 1800 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Figure 19:
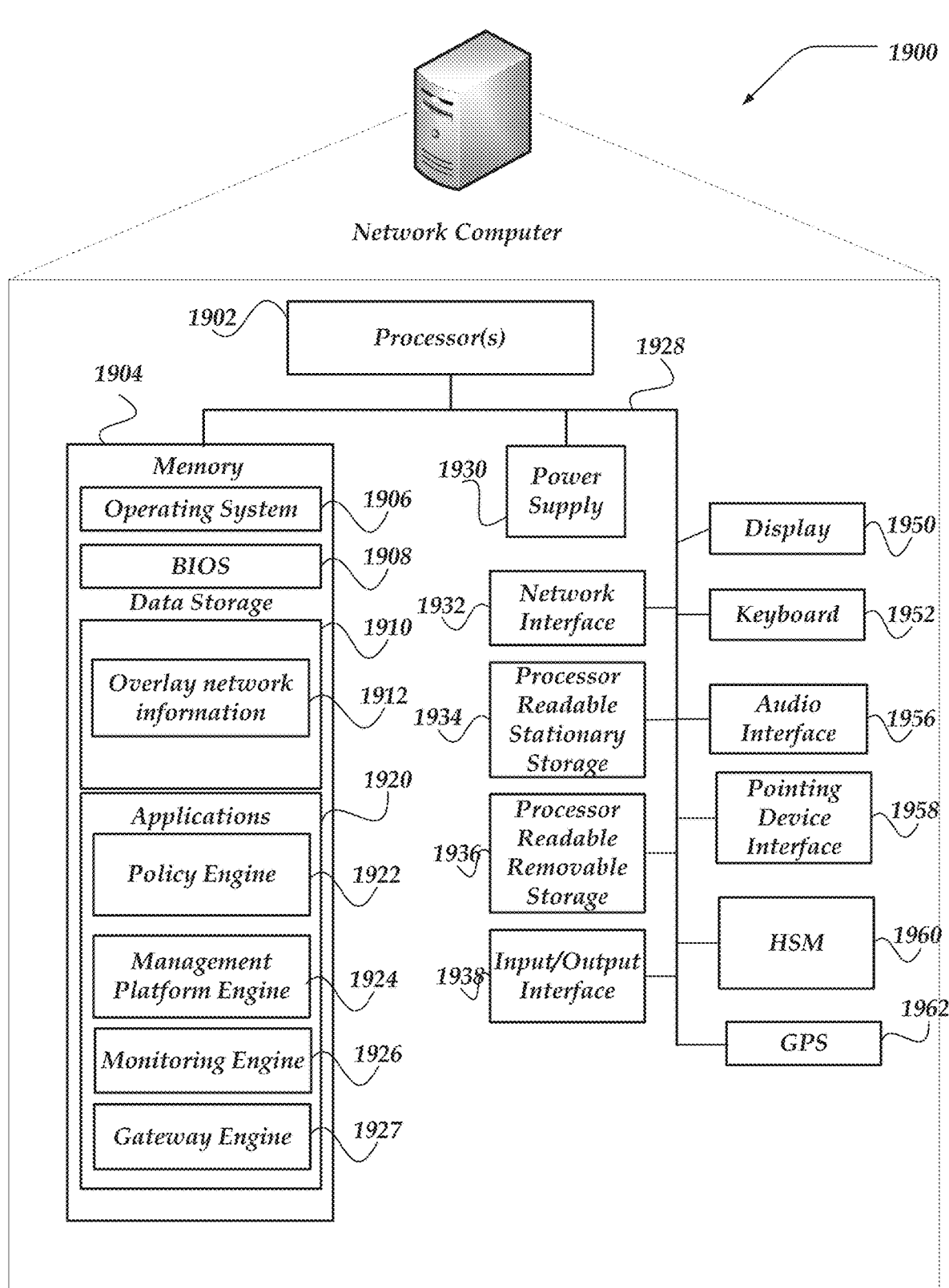
FIG. 19 illustrates a schematic embodiment of a network computer.

FIG. 19 shows one embodiment of network computer 1900 that may be included in a system implementing the innovations disclosed herein. Network computer 1900 may include many more or less components than those shown in FIG. 19. However, the components shown are sufficient to disclose an illustrative embodiment for practicing these innovations. Network computer 1900 may represent, for example, one embodiment of one or more of management platform server computer 1716, gateway computers 1718, relay computers 1722, one or more node computers 1720, or building management system server computer 1724 of FIG. 17.

As shown in the figure, network computer 1900 includes a processor 1902 in communication with a memory 1904 via a bus 1928. Network computer 1900 also includes a power supply 1930, network interface 1932, audio interface 1956, display 1950, keyboard 1952, input/output interface 1938, processor-readable stationary storage device 1934, and processor-readable removable storage device 1936. Power supply 1930 provides power to network computer 1900.

In at least one of the various embodiments, processor 1902 may include one or more separate hardware processors that are arranged to perform one or more specific task or actions. Also, in some embodiments, the one or more hardware processors comprising processor 1902 may be the same processor. In some embodiments, the one or more hardware processors comprising processor 1902 may be the included in the same network computer. In some embodiments, one or more of the one or more hardware processors comprising processor 1902 may be included in different network computers.

Network interface 1932 includes circuitry for coupling network computer 1900 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 1932 is sometimes known as a transceiver, transceiving device, or network interface card (NIC). Network computer 1900 may optionally communicate with a base station (not shown), or directly with another computer.

Audio interface 1956 is arranged to produce and receive audio signals such as the sound of a human voice. For example, audio interface 1956 may be coupled to a speaker and microphone (not shown) to facilitate telecommunication with others or generate an audio acknowledgement for some action. A microphone in audio interface 1956 can also be used for input to or control of network computer 1900, for example, using voice recognition.

Display 1950 may be a liquid crystal display (LCD), gas plasma, electronic ink, light emitting diode (LED), Organic LED (OLED) or any other type of light reflective or light transmissive display that can be used with a computer. Display 1950 may be a handheld projector or pico projector capable of projecting an image on a wall or other object.

Network computer 1900 may also comprise input/output interface 1938 for communicating with external devices or computers not shown in FIG. 19. Input/output interface 1938 can utilize one or more wired or wireless communication technologies, such as USB™, Firewire™, Wi-Fi, WiMax, Thunderbolt™, Infrared, Bluetooth™, Zigbee™, serial port, parallel port, and the like.

GPS transceiver 1962 can determine the physical coordinates of network computer 1900 on the surface of the Earth, which typically outputs a location as latitude and longitude values. GPS transceiver 1962 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 1900 on the surface of the Earth. It is understood that under different conditions, GPS transceiver 1962 can determine a physical location for network computer 1900. In at least one embodiment, however, network computer 1900 may, through other components, provide other information that may be employed to determine a physical location of the client computer, including for example, a Media Access Control (MAC) address, IP address, and the like.

Human interface components can be physically be separate from network computer 1900, allowing for remote input or output to network computer 1900. For example, information routed as described here through human interface components such as display 1950 or keyboard 1952 can instead be routed through the network interface 1932 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 1958 to receive user input.

Memory 1904 may include Random Access Memory (RAM), Read-Only Memory (ROM), or other types of memory. Memory 1904 illustrates an example of computer-readable storage media (devices) for storage of information such as computer-readable instructions, data structures, program modules or other data. Memory 1904 stores a basic input/output system (BIOS) 1908 for controlling low-level operation of network computer 1900. The memory also stores an operating system 1906 for controlling the operation of network computer 1900. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with a Java virtual machine module that facilitates control of hardware components or operating system operations via Java application programs. Likewise, other runtime environments may be included.

Memory 1904 may further include one or more data storage 1910, which can be utilized by network computer 1900 to store, among other things, applications 1920 or other data. For example, data storage 1910 may also be employed to store information that describes various capabilities of network computer 1900. The information may then be provided to another device or computer based on any of a variety of events, including being sent as part of a header during a communication, sent upon request, or the like. Data storage 1910 may also be employed to store social networking information including address books, buddy lists, aliases, user profile information, or the like. Data storage 1910 may further include program code, instructions, data, algorithms, and the like, for use by a processor, such as processor 1902 to execute and perform actions such as those actions described below. In one embodiment, at least some of data storage 1910 might also be stored on another component of network computer 1900, including, but not limited to, non-transitory media inside processor-readable removable storage device 1936, processor-readable stationary storage device 1934, or any other computer-readable storage device within network computer 1900, or even external to network computer 1900.

Data storage 1910 may include, for example, overlay network information 1912, or the like. Overlay network information 1912 may contain policy data defining which gateways or node computers are allowed to communicate with each other as well as the physical network routes that may be available. In one embodiment, overlay network information 1912 may be generated and stored on management platform servers, such as, management platform server computer 1716 before being distributed to gateway computers 1718, relay computers 1722, or the like.

Applications 1920 may include computer executable instructions which, when executed by network computer 1900, transmit, receive, or otherwise process messages (e.g., SMS, Multimedia Messaging Service (MMS), Instant Message (IM), email, or other messages), audio, video, and facilitates telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 1920 may include policy engine 1922, management platform engine 1924, monitoring engine 1926, or gateway engine 1927 which may be configured to perform actions further described below. In at least one of the various embodiments, one or more of the applications or portions of applications may be implemented as modules or components of another application. Further, in one or more of the various embodiments, applications or portions of applications may be implemented as operating system extensions, modules, plugins, or the like.

In at least one of the various embodiments, applications, such as, operating system 1906, policy engine 1922, management platform engine 1924, monitoring engine 1926, or gateway engine 1927, or the like, may be arranged to employ geo-location information to select one or more localization features, such as, time zones, languages, currencies, calendar formatting, or the like. Localization features may be used when interpreting network traffic, interpreting node computer activity, monitoring or logging application activity, user-interfaces, reports, as well as internal processes or databases. In at least one of the various embodiments, geo-location information used for selecting localization information may be provided by GPS 1962. Also, in some embodiments, geolocation information may include information provided using one or more geolocation protocols over the networks, such as, wireless network 1708 or network 1710.

Furthermore, in at least one of the various embodiments, policy engine 1922, management platform engine 1924, monitoring engine 1926, or gateway engine 1927, or the like, may be operative in a cloud-based computing environment. In at least one of the various embodiments, these applications, and others, that comprise the management platform may be executing within virtual machines or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines or virtual servers dedicated to policy engine 1922, management platform engine 1924, monitoring engine 1926, or gateway engine 1927, or the like, may be provisioned and de-commissioned automatically. Also, in at least one of the various embodiments, overlay network information 1912, or the like, may be located in virtual servers running in a cloud-based computing environment rather than being tied to one or more specific physical network computers. In some embodiments, various applications, data storage, or the like, may be operative in one or more container computers executing in a container computing environment.

Further, network computer 1900 may also comprise hardware security module (HSM) 1960 for providing additional tamper resistant safeguards for generating, storing or using security/cryptographic information such as, keys, digital certificates, passwords, passphrases, two-factor authentication information, or the like. In some embodiments, hardware security module may be configured to support one or more standard public key infrastructures (PKI), and may be employed to generate, manage, or store keys pairs, or the like. In some embodiments, HSM 1960 may be a stand-alone network computer, in other cases, HSM 1960 may be arranged as a hardware card that may be installed in a network computer.

Additionally, in one or more embodiments (not shown in the figures), network computer 1900 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins or wireless transceivers) to perform some or all actions. In some embodiments, some or all of the actions may be performed by a system on a chip (COS), or the like.

In various embodiments, the operating environment shown in FIG. 17 through FIG. 19 may be used in connection with or in conjunction with the systems and methods described above with reference to FIG. 1 through FIG. 4. For example, the computers 1702-1705 and client computer 1800 may be similar to the client devices 448 described above, the BMS 366 may be embodied on, execute on, or otherwise a component of the management platform server computer 1716, etc. Additionally, various gateway computers 1718, node computers 1720, and/or relay computers 1722 may be deployed or provided at various building subsystems 428 for controlling, monitoring, obtaining feedback from, or otherwise executing in connection with the building subsystems 428. In various embodiments, and as described in greater detail below with reference to FIG. 8, the computers 1702-1705, management platform server computer 1716, and node computers 1720 may be communicably coupled to one another via an overlay network. The overlay network may be formed by or provided by the gateway computers 1718, relay computers 1722, etc.

As described in greater detail below, an overlay network which provides or facilitates communication between various components (such as those described above with reference to FIG. 1-FIG. 4) may have various benefits or improvements over other technology/systems/solutions. For example, the systems and methods described herein may at least facilitate the automatic discovery of manageable entities for managed integration with overlay networks such that the integration with overlay networks facilitates the distribution or enforcement of network policies in via the overlay network.

What is claimed:

1. A method for managing communication over a network using one or more processors to execute instructions that are configured to cause actions, comprising:

classifying one or more entities based on one or more characteristics of the one or more entities and one or more portions of network traffic in an underlay network;

generating one or more policies for an overlay network based on one or more of the one or more classified entities or the one or more portions of the network traffic;

deploying the one or more policies to one or more gateways that are associated with the one or more entities, wherein the one or more gateways facilitate access by the one or more entities to the overlay network based on the one or more policies; and in response to identifying one or more other entities in the underlay network based on other network traffic in the overlay network and the network traffic in the underlay network, performing further actions including:

updating the one or more policies based on the other network traffic in the overlay network, the network traffic in the underlay network, or the one or more other entities; and deploying the one or more updated policies to the one or more gateways or one or more other gateways, wherein the one or more gateways or the one or more other gateways facilitate access by the one or more other entities to the overlay network based on the one or more updated policies.

2. The method of claim 1, further comprising:

generating one or more candidate policies for an overlay network based on one or more of the one or more classified entities or the one or more portions of the network traffic, wherein the one or more policies are generated based on the one or more candidate policies.

3. The method of claim 1, further comprising:

grouping the one or more classified entities into one or more groups based on one or more of the one or more characteristics of the one or more classified entities, the network traffic in the underlay network, or the other network traffic in the overlay network; and associating the one or more policies with the one or more groups, wherein the one or more classified entities are configured to access the overlay network based on the one or more policies associated with a group that includes the one or more entities.

4. The method of claim 1, wherein deploying the one or more policies to the one or more gateways, further comprises:

modifying one or more network parameters of the one or more entities, wherein the one or more modified network parameters cause the one or more entities to provide requests to one or more target entities in the overlay network via the one or more gateways.

5. The method of claim 1, further comprising:

in response to determining that the one or more entities communicate with one or more external entities that are located outside of a local portion of the underlay network, modifying the one or more policies to facilitate the one or more entities to communicate with the one or more external entities.

6. The method of claim 1, further comprising:

monitoring network traffic in the underlay network, wherein monitoring network traffic includes one or more of passive monitoring of the network traffic, inspection of protocol headers associated with the monitored network traffic, or deep inspection of one or more network packets associated with the monitored network traffic.

7. The method of claim 1, further comprising:

modifying the one or more policies based on a data structure which defines one or more of a computer, a device, a service, or an application as being associated with the one or more entities.

8. A network computer for managing communication over one or more networks, comprising:

a memory that stores at least instructions; and one or more processors that execute instructions that are configured to cause actions, including:

classifying one or more entities based on one or more characteristics of the one or more entities and one or more portions of network traffic in an underlay network;

generating one or more policies for an overlay network based on one or more of the one or more classified entities or the one or more portions of the network traffic;

deploying the one or more policies to one or more gateways that are associated with the one or more entities, wherein the one or more gateways facilitate by the one or more entities access to the overlay network based on the one or more policies; and in response to identifying one or more other entities in the underlay network based on other network traffic in the overlay network and the network traffic in the underlay network, performing further actions including:

updating the one or more policies based on the other network traffic in the overlay network, the network traffic in the underlay network, or the one or more other entities; and deploying the one or more updated policies to the one or more gateways or one or more other gateways, wherein the one or more gateways or the one or more other gateways facilitate access to the overlay network based on the one or more updated policies.

9. The network computer of claim 8, wherein the instructions executed by the one or more processors are configured to cause further actions, comprising:

generating one or more candidate policies for an overlay network based on one or more of the one or more classified entities or the one or more portions of the network traffic, wherein the one or more policies are generated based on the one or more candidate policies.

10. The network computer of claim 8, wherein the instructions executed by the one or more processors are configured to cause further actions, comprising:

grouping the one or more classified entities into one or more groups based on one or more of the one or more characteristics of the one or more classified entities, the network traffic in the underlay network, or the other network traffic in the overlay network; and associating the one or more policies with the one or more groups, wherein the one or more classified entities are configured to access the overlay network based on the one or more policies associated with a group that includes the one or more entities.

11. The network computer of claim 8, wherein deploying the one or more policies to the one or more gateways, further comprises:

modifying one or more network parameters of the one or more entities, wherein the one or more modified network parameters cause the one or more entities to provide requests to one or more target entities in the overlay network via the one or more gateways.

12. The network computer of claim 8, wherein the instructions executed by the one or more processors are configured to cause further actions, comprising:

in response to determining that the one or more entities communicate with one or more external entities that are located outside of a local portion of the underlay network, modifying the one or more policies to facilitate the one or more entities to communicate with the one or more external entities.

13. The network computer of claim 8, wherein the instructions executed by the one or more processors are configured to cause further actions, comprising:

monitoring network traffic in the underlay network, wherein monitoring network traffic includes one or more of passive monitoring of the network traffic, inspection of protocol headers associated with the monitored network traffic, or deep inspection of one or more network packets associated with the monitored network traffic.

14. The network computer of claim 8, wherein the instructions executed by the one or more processors are configured to cause further actions, comprising:

modifying the one or more policies based on a data structure which defines one or more of a computer, a device, a service, or an application that is associated with the one or more entities.

15. A processor readable non-transitory storage media that includes instructions configured for managing communication over a network, wherein execution of the instructions by one or more processors on one or more network computers cause actions, comprising:

classifying one or more entities based on one or more characteristics of the one or more entities and one or more portions of network traffic in an underlay network;

generating one or more policies for an overlay network based on one or more of the one or more classified entities or the one or more portions of the network traffic;

deploying the one or more policies to one or more gateways that are associated with the one or more entities, wherein the one or more gateways facilitate access by the one or more entities to the overlay network based on the one or more policies; and in response to identifying one or more other entities in the underlay network based on other network traffic in the overlay network and the network traffic in the underlay network, performing further actions including:

updating the one or more policies based on the other network traffic in the overlay network, the network traffic in the underlay network, or the one or more other entities; and deploying the one or more updated policies to the one or more gateways or one or more other gateways, wherein the one or more gateways or the one or more other gateways facilitate access by the one or more other entities to the overlay network based on the one or more updated policies.

16. The media of claim 15, further comprising:

generating one or more candidate policies for an overlay network based on one or more of the one or more classified entities or the one or more portions of the network traffic, wherein the one or more policies are generated based on the one or more candidate policies.

17. The media of claim 15, further comprising:

grouping the one or more classified entities into one or more groups based on one or more of the one or more characteristics of the one or more classified entities, the network traffic in the underlay network, or the other network traffic in the overlay network; and associating the one or more policies with the one or more groups, wherein the one or more classified entities are configured to access to the overlay network based on the one or more policies associated with a group that includes the one or more entities.

18. The media of claim 15, wherein deploying the one or more policies to the one or more gateways, further comprises:

modifying one or more network parameters of the one or more entities, wherein the one or more modified network parameters cause the one or more entities to provide requests to one or more target entities in the overlay network via the one or more gateways.

19. The media of claim 15, further comprising:

in response to determining that the one or more entities communicate with one or more external entities that are located outside of a local portion of the underlay network, modifying the one or more policies to facilitate the one or more entities to communicate with the one or more external entities.

20. The media of claim 15, further comprising:

monitoring network traffic in the underlay network, wherein monitoring network traffic includes one or more of passive monitoring of the network traffic, inspection of protocol headers associated with the monitored network traffic, or deep inspection of one or more network packets associated with the monitored network traffic.

* * * * *